(12) United States Patent
Acome et al.

(10) Patent No.: US 12,203,454 B2
(45) Date of Patent: Jan. 21, 2025

(54) MINIATURE SOFT HYDRAULIC ELECTROSTATIC ZIPPING ACTUATORS AND ASSOCIATED METHODS

(71) Applicant: Artimus Robotics Inc., Boulder, CO (US)

(72) Inventors: Eric Lucas Acome, Longmont, CO (US); Nicholas Alexander Kellaris, Boulder, CO (US); Shane Karl Mitchell, Boulder, CO (US); Jennifer Lyn Vigil, Boulder, CO (US)

(73) Assignee: Artimus Robotics Inc., Boulder, CO (US)

( * ) Notice: Subject to any disclaimer, the term of this patent is extended or adjusted under 35 U.S.C. 154(b) by 0 days.

(21) Appl. No.: 18/237,388

(22) Filed: Aug. 23, 2023

(65) Prior Publication Data

US 2024/0068451 A1 Feb. 29, 2024

Related U.S. Application Data

(60) Provisional application No. 63/400,329, filed on Aug. 23, 2022.

(51) Int. Cl.
*F03G 7/00* (2006.01)
*F15B 15/10* (2006.01)

(52) U.S. Cl.
CPC ............ *F03G 7/008* (2021.08); *F15B 15/103* (2013.01)

(58) Field of Classification Search
CPC .. F03G 7/00; F03G 7/06–7/067; F03G 7/008; F15B 15/08–15/19; F15B 21/06;
(Continued)

(56) References Cited

U.S. PATENT DOCUMENTS 10,995,779 B2   5/2021   Keplinger et al.
11,408,452 B2   8/2022   Keplinger et al.
(Continued)

FOREIGN PATENT DOCUMENTS

WO   2018175741 A1   9/2018
WO   2019173227 A1   9/2019
(Continued)

OTHER PUBLICATIONS

Acome, Eric et al., Hydraulically amplified self-healing electrostatic actuators with muscle-like performance, Science 359, pp. 61-65, (2018).
(Continued)

*Primary Examiner* — Loren C Edwards
(74) *Attorney, Agent, or Firm* — Neugeboren O'Dowd PC

(57) ABSTRACT

An actuator system includes an actuator with a deformable shell defining a pouch, a fluid dielectric contained within the pouch, and first and second electrodes disposed over opposing sides of the pouch, each electrode having two long edges and two short edges. The system also includes a power source for providing a voltage between the electrodes. The electrodes cover 50 to 90% of the first and second sides, respectively, of the pouch, and a gap is defined between long edges of the pouch and the electrodes such that, upon application of the voltage at one of the short edges of the electrodes, respectively, the electrodes selectively zip together from the one of the short edges toward an opposing one of the short edges. The system may also include a support structure for enabling the actuator to maintain its shape regardless of the voltage provided by the power source.

13 Claims, 30 Drawing Sheets

(58) Field of Classification Search
CPC ...... F15B 21/065; H02N 1/002; H02N 1/006; B25J 9/12; B25J 9/14; B25J 9/142
See application file for complete search history.

(56) References Cited

U.S. PATENT DOCUMENTS

| | | | |
|---|---|---|---|
| 11,486,421 | B2 | 11/2022 | Keplinger et al. |
| 11,635,094 | B2 | 4/2023 | Keplinger et al. |
| 11,795,979 | B2 | 10/2023 | Keplinger et al. |
| 11,827,459 | B2 | 11/2023 | Morrissey et al. |
| 2020/0032822 | A1* | 1/2020 | Keplinger ............... F15B 15/18 |
| 2021/0172460 | A1* | 6/2021 | Keplinger ............. F15B 15/103 |
| 2021/0369547 | A1* | 12/2021 | Mau ..................... A61H 9/0021 |
| 2022/0088774 | A1* | 3/2022 | Kim ......................... B25J 9/142 |
| 2022/0158570 | A1 | 5/2022 | Keplinger et al. |
| 2022/0316466 | A1 | 10/2022 | Mitchell et al. |
| 2023/0091400 | A1 | 3/2023 | Acome et al. |
| 2023/0200250 | A1 | 6/2023 | Correll et al. |
| 2023/0258203 | A1 | 8/2023 | Keplinger et al. |
| 2023/0278477 | A1 | 9/2023 | Acome et al. |
| 2023/0340970 | A1 | 10/2023 | Acome et al. |

FOREIGN PATENT DOCUMENTS

| | | |
|---|---|---|
| WO | 2020180982 A1 | 9/2020 |
| WO | 2020180986 A1 | 9/2020 |
| WO | 2021030742 A1 | 2/2021 |
| WO | 2022050997 A2 | 3/2022 |
| WO | 2023158568 A1 | 8/2023 |

OTHER PUBLICATIONS

Kellaris, Nicholas et al., "An analytical model for the design of Peano-HASEL actuators with drastically improved performance", Extreme Mechanics Letters, 29, (2019), 100449, published by Elsevier Ltd., 10 pages.

Kellaris, Nicholas et al., Peano-HASEL actuators: Muscle-mimetic, electrohydraulic transducers that linearly contract on activation, Sci. Robot. 3, eaar 3276, (2018), 11 pages.

Mitchell, et al.; An Easy-to-Implement Toolkit to Create Versatile and High-Performance HASEL Actuators for Untethered Soft Robots; Adv. Sci.; 2019, 6, 1900178, 15 pages.

Rothemund, et al.; Dynamics of electrohydraulic soft actuators; PNAS; vol. 117; No. 28; Jul. 14, 2020; pp. 16207-16213.

Wang et al.; High strain Peano-HASEL actuators; doi:10.1002/adfm. 201908821; Dec. 15, 2019, 24 pages.

Wang, Xingrui et al., "High-Strain Peano-HASEL Actuators", Adv. Funct. Mater., 2020, 30, 1908821, 9 pages.

* cited by examiner

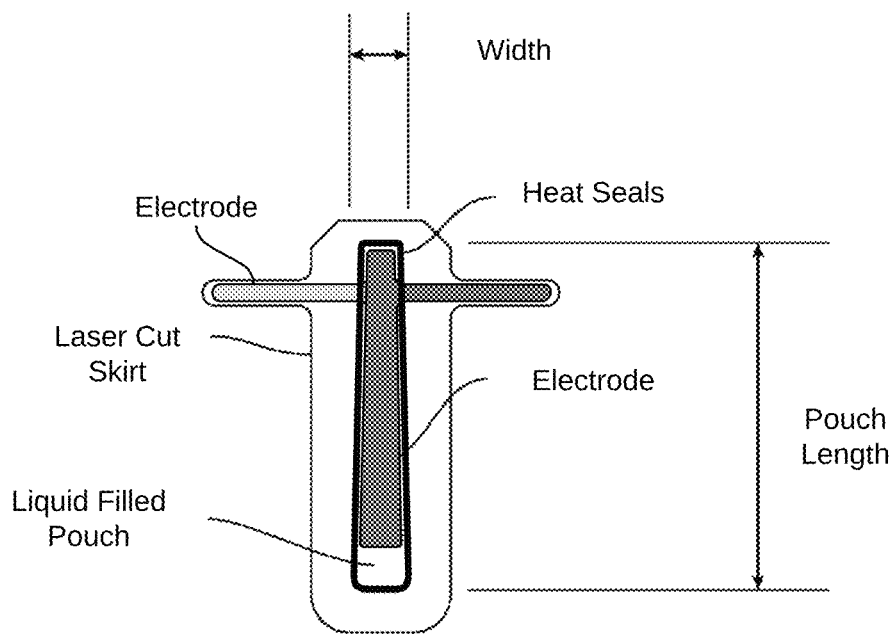
FIG. 2A
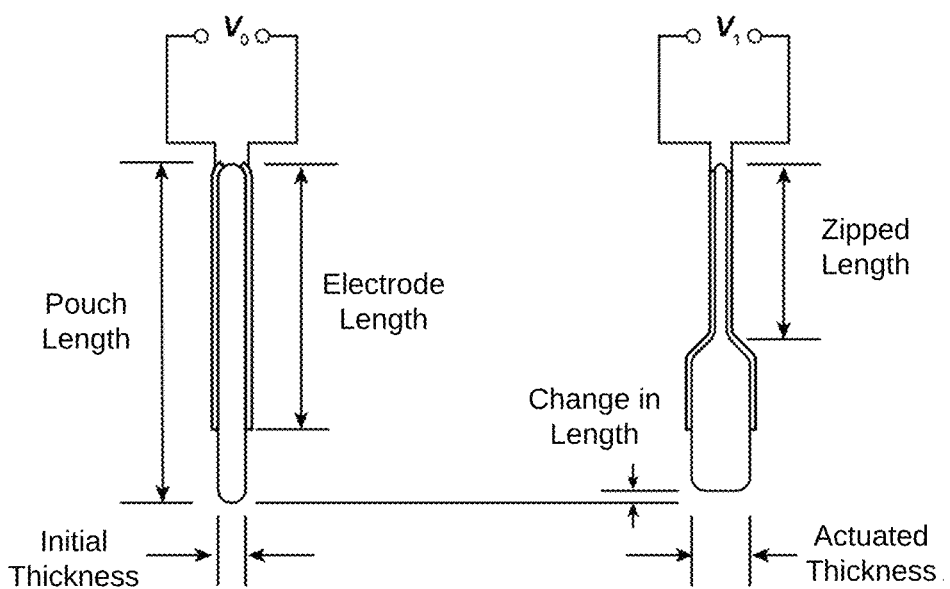
FIG. 2B          FIG. 2C

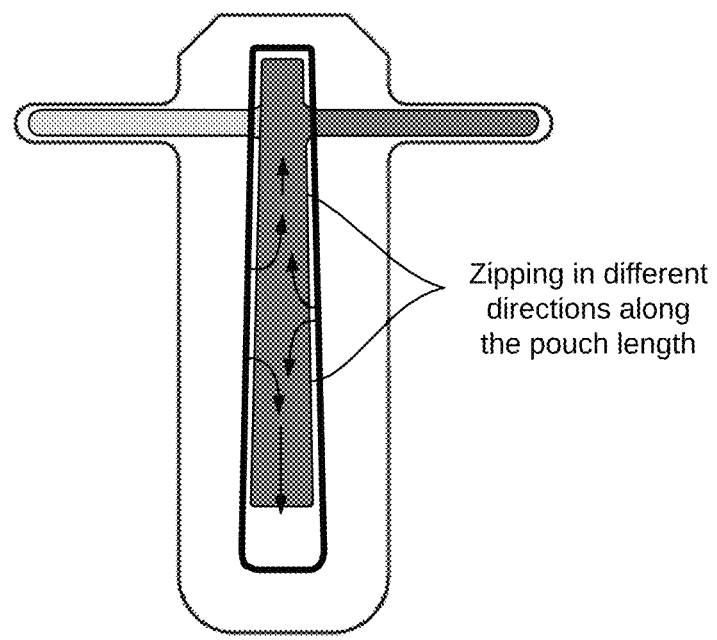
FIG. 3A
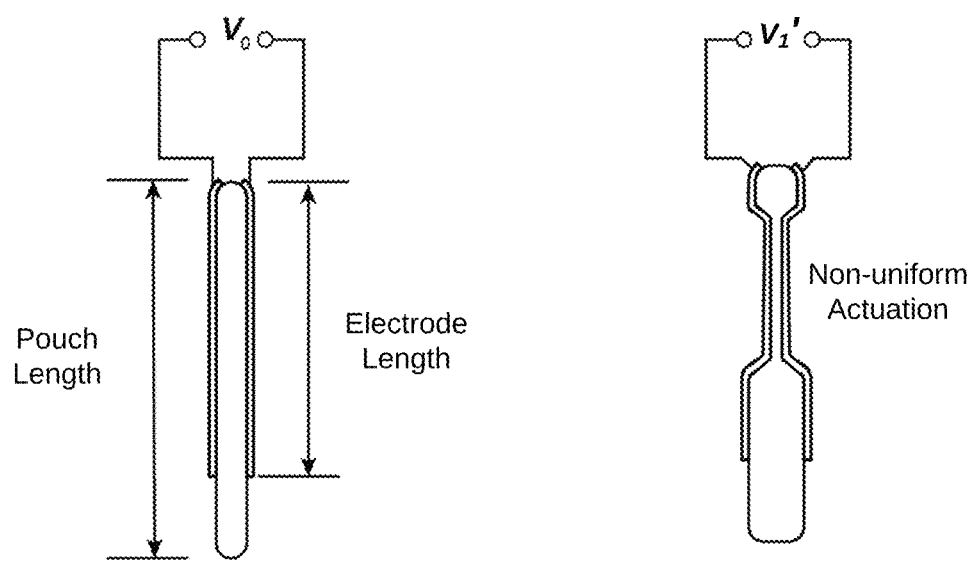
FIG. 3B  FIG. 3C

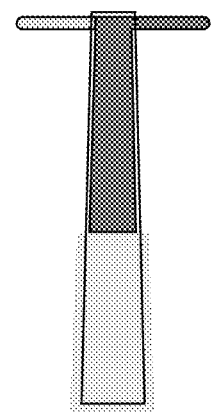
FIG. 12A
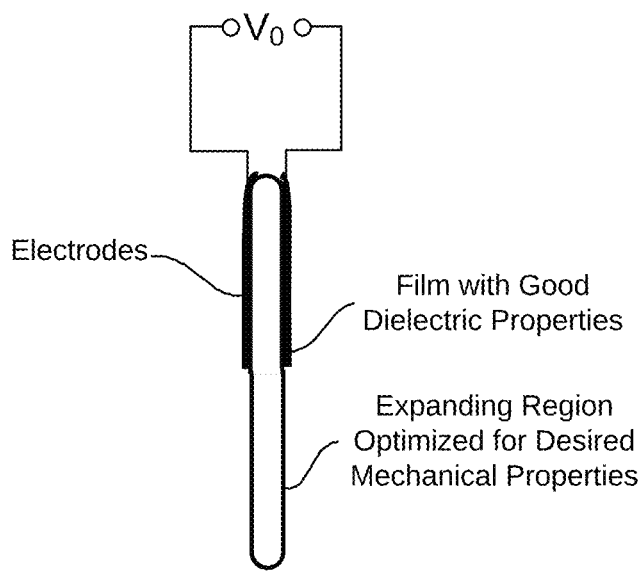 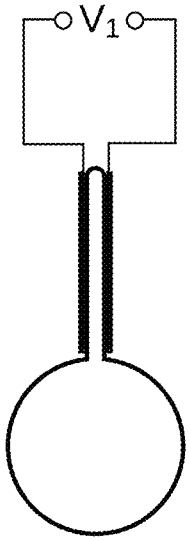
FIG. 12B        FIG. 12C

FIG. 18A $V_1$
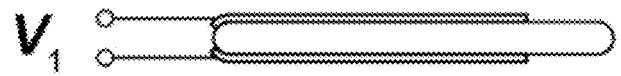
FIG. 18B $V_2$
FIG. 18C $V_3$
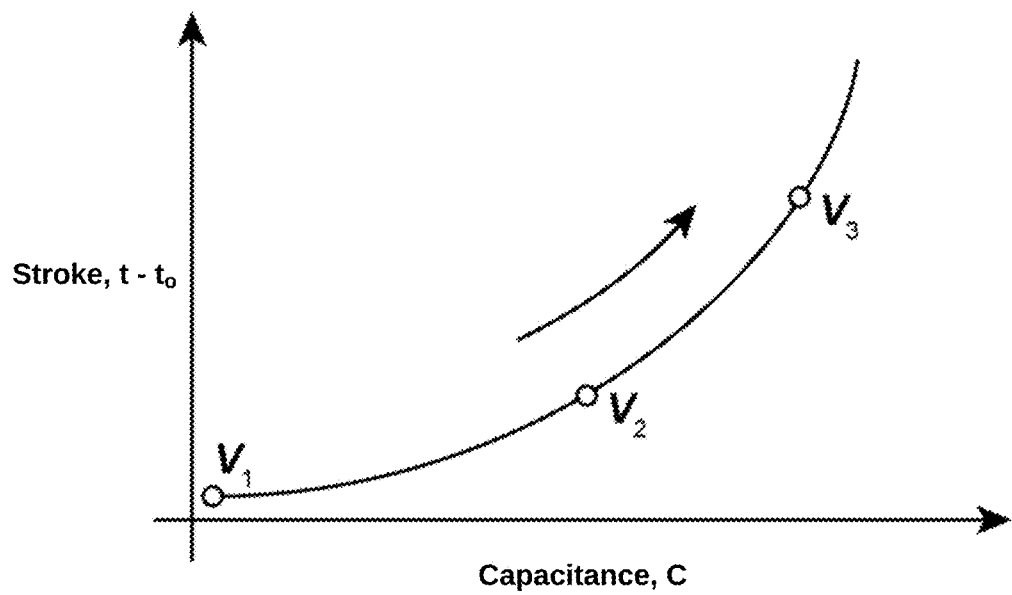
FIG. 18D FIG. 19A
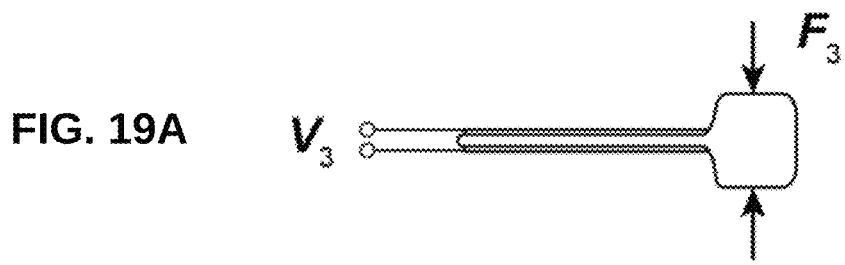
FIG. 19B
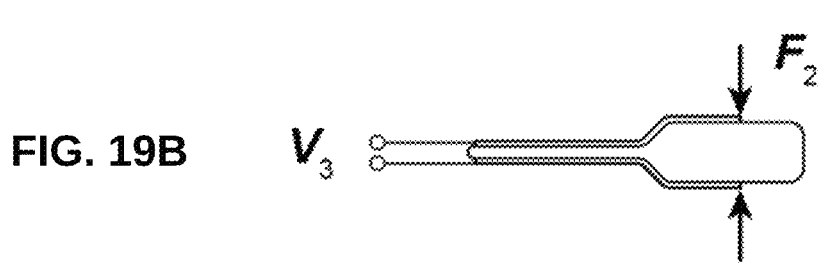
FIG. 19C
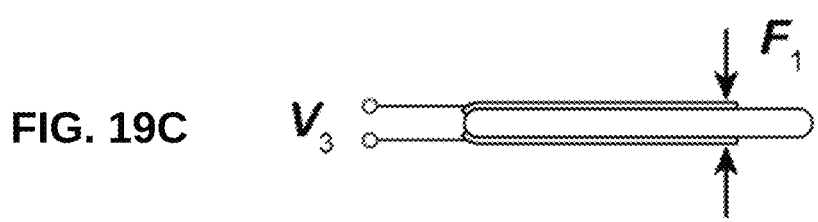
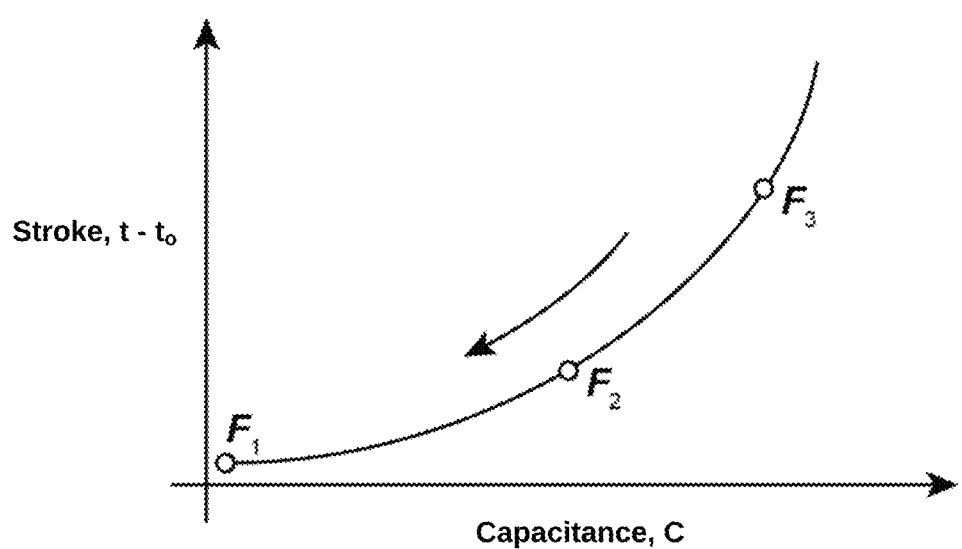
FIG. 19D

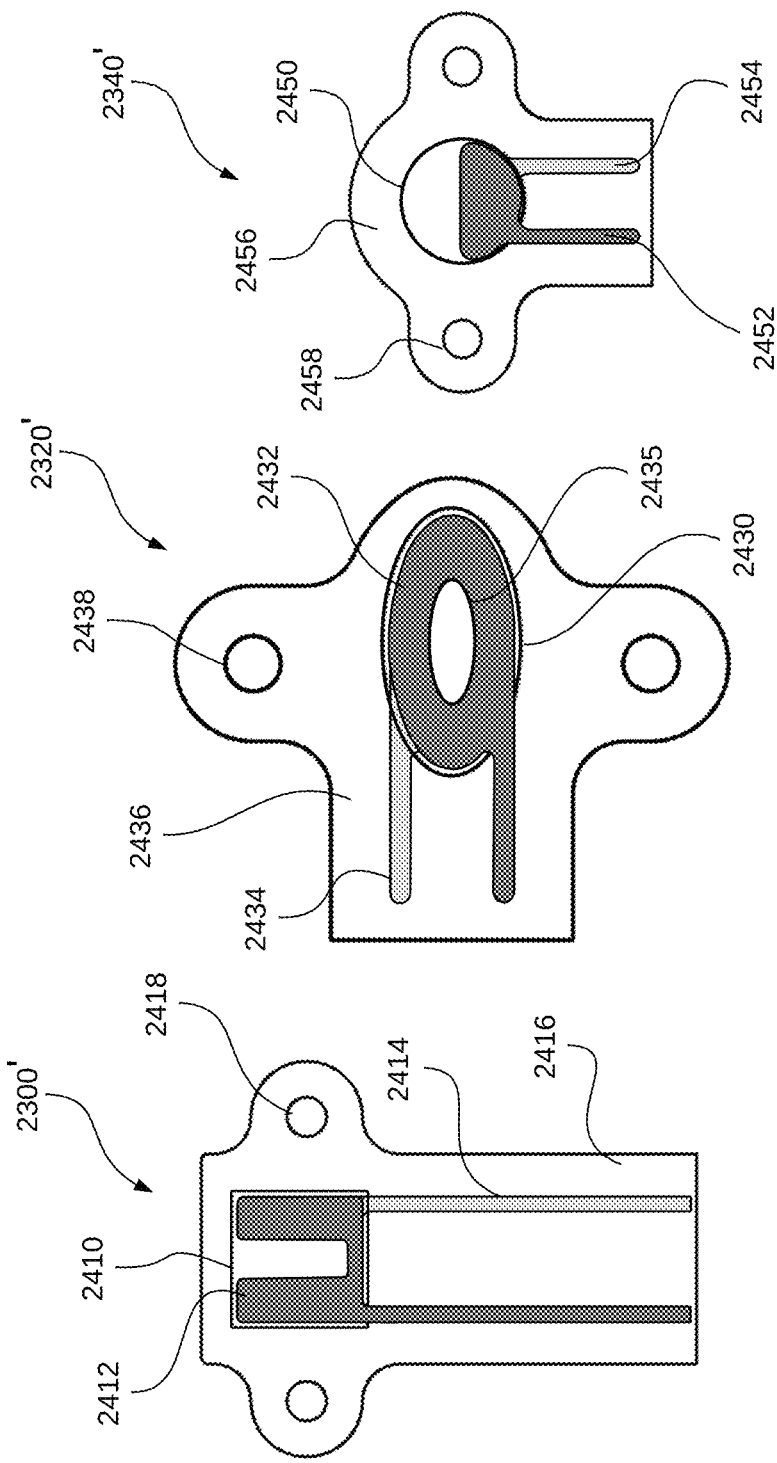

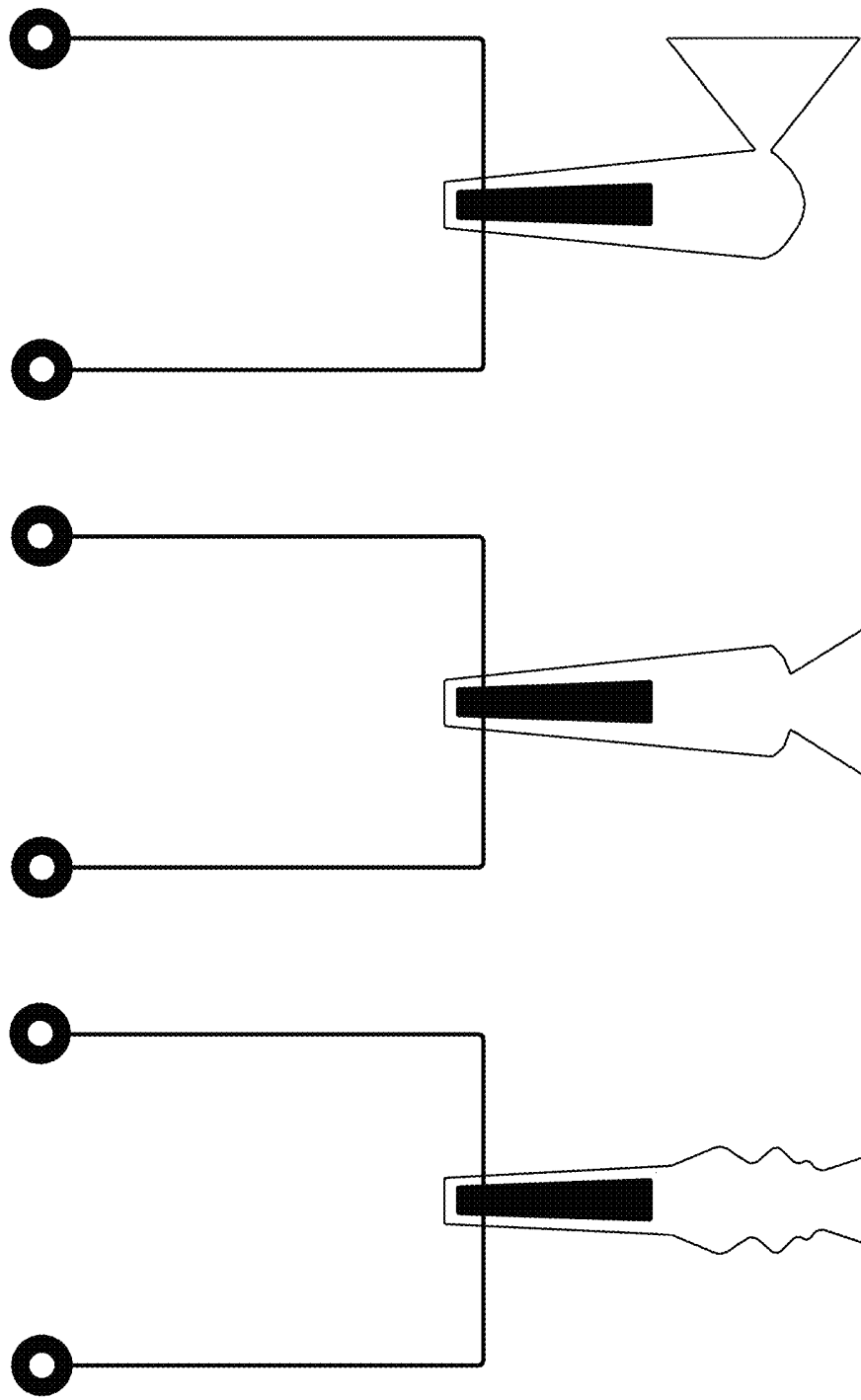

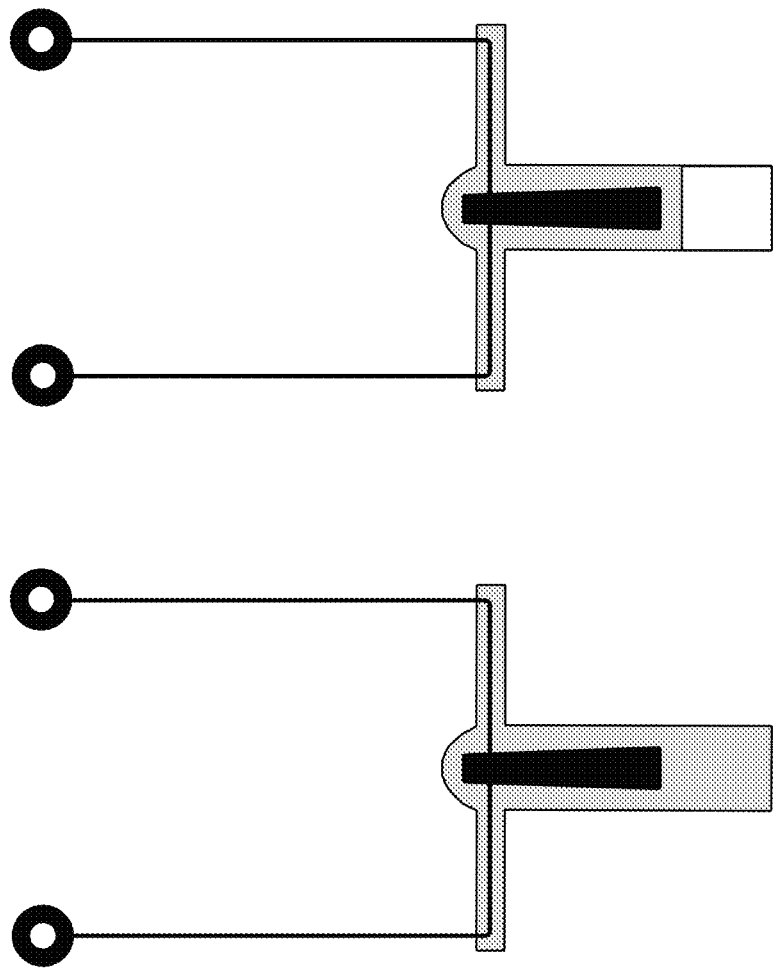

MINIATURE SOFT HYDRAULIC ELECTROSTATIC ZIPPING ACTUATORS AND ASSOCIATED METHODS

REFERENCE TO RELATED APPLICATIONS

The present application claims the benefit of U.S. Provisional Pat. App. No. 63/400,329, filed 2022 Aug. 23 and titled "Miniature Soft Hydraulic Electrostatic Zipping Actuators," which application is incorporated hereby in its entirety by reference.

SPONSORED RESEARCH AND DEVELOPMENT

This invention was made with government support under Award Number (FAIN) 2136844 awarded by the National Science Foundation. The government has certain rights in the invention.

FIELD OF THE INVENTION

The present invention relates to actuators. In particular, but not by way of limitation, the present invention relates to miniature soft hydraulic electrostatic actuators.

DESCRIPTION OF RELATED ART

Various forms of Hydraulically Amplified Self-Healing Electrostatic (HASEL) actuators have been described in the past. For instance, the following patent applications describe HASEL actuators and variations: PCT Publication No. WO 2018/175741, filed on 2018 Mar. 22 and titled "HYDRAULICALLY AMPLIFIED SELF-HEALING ELECTROSTATIC TRANSDUCERS;" PCT Application No. PCT/US2019/020568, filed on 2019 Mar. 4 and titled "HYDRAULICALLY AMPLIFIED SELF-HEALING ELECTROSTATIC TRANSDUCERS HARNESSING ZIPPING MECHANISM;" PCT Application No. PCT/US20/20986, filed 2020 Mar. 4 and titled "FOLDABLE FILLING FABRICATION AND COMPOSITE LAYERING OF HYDRAULICALLY AMPLIFIED SELF-HEALING ELECTROSTATIC TRANSDUCERS;" PCT Application No. PCT/US20/20978, filed 2020 Mar. 4 and titled "COMPOSITE LAYERING OF HYDRAULICALLY AMPLIFIED SELF-HEALING ELECTROSTATIC TRANSDUCERS;" PCT Application No. PCT/US2020/046494, filed 2020 Aug. 14 and titled "HYDRAULICALLY AMPLIFIED SELF-HEALING ELECTROSTATIC (HASEL) PUMPS;" PCT Application No. PCT/US21/35041, filed 2021 May 29 and titled "CAPACITIVE SELF-SENSING FOR ELECTROSTATIC TRANSDUCERS WITH HIGH VOLTAGE ISOLATION," and U.S. patent application Ser. No. 18/234,688, filed 2023 Aug. 16 and titled "PERFORMANCE IMPROVEMENTS FOR SOFT HYDRAULIC ELECTROSTATIC ZIPPING ACTUATORS." All of the above referenced patent applications are incorporated hereby in their entirety by reference.

While the above referenced applications relate to soft hydraulic electrostatic actuators at a macro scale (e.g., each actuator having a diameter on the order of one-inch). It would be desirable to have smaller soft hydraulic electrostatic actuators with favorable operational performance (e.g., force vs. stroke).

SUMMARY OF THE INVENTION

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In an aspect, miniature soft hydraulic electrostatic zipping actuators, specifically "HASEL" actuators, are presented. These actuators feature a geometry with large length to width ratio to achieve large actuation strain in a limited volume. Specific features are described which improve the zipping performance in this form factor. These actuators can also be coupled to mechanical components that amplify force and/or stroke. Modifications to the actuator structure or additional components can improve actuator holding force. Finally, a few specific applications are illustrated or discussed.

In an embodiment, an actuator system includes an actuator with a deformable shell defining a pouch, a fluid dielectric contained within the pouch, and first and second electrodes disposed over opposing sides of the pouch, each electrode having two long edges and two short edges. The system also includes a power source for providing a voltage between the electrodes. The electrodes cover 50 to 90% of the first and second sides, respectively, of the pouch, and a gap is defined between long edges of the pouch and the electrodes such that, upon application of the voltage at one of the short edges of the electrodes, respectively, the electrodes selectively zip together from the one of the short edges toward an opposing one of the short edges.

In embodiments, the gap is angled from the one of the short edges at which the voltage is applied and toward the opposing one of the short edges.

In embodiments, the pouch includes an edge feature configured for increased pouch flexibility. Further, the pouch may be asymmetric in shape.

In embodiments, the first and second electrodes are configured for preferentially directing the fluid dielectric toward a particular location within the pouch. The first and second electrodes may include at least one of a C-shape, an oval-shape, and a half moon shape.

In embodiments the system further includes an inflatable bladder located remotely from the actuator, and a connector for connecting the inflatable bladder with the actuator. In this case, activation of the actuator is correlated with activation of the inflatable bladder. In embodiments, the power source may also be located remotely from the inflatable bladder. The inflatable bladder may be incorporated into a wearable device.

In embodiments, the system includes a reinforcement layer covering at least the first and second electrodes.

In embodiments, the first and second electrodes are formed of a rigid material.

In embodiments, the system further includes an amplification mechanism for amplifying a motion of the actuator. The amplification mechanism may be, for example, a lever or a flexure.

In embodiments, the pouch is formed of a first material in portions of the pouch in direct contact with the first and second electrodes, and the pouch is also formed of a second material in portions of the pouch not in direct contact with the first and second electrodes.

In embodiments, an actuator system includes an actuator with a deformable shell defining a pouch including an enclosed internal cavity, a fluid dielectric contained within the enclosed internal cavity, a first electrode disposed over a first side of the pouch and having two long edges and two short edges, and a second electrode disposed over a second side of the pouch and having two long edges and two short edges. The system further includes a power source for providing a voltage across the enclosed internal cavity between the first and second electrodes. The system additionally includes a support structure for enabling the actuator to maintain its shape regardless of the voltage provided by the power source.

In embodiments, the support structure includes at least one of a variable stiffness material, a phase change material, an electrostatic clutch, and a magnet.

In embodiments, a method for operating an actuator system includes providing an actuator with a deformable shell defining a pouch including an enclosed internal cavity, a fluid dielectric contained within the enclosed internal cavity, a first electrode disposed over a first side of the pouch and having two long edges and two short edges, and a second electrode disposed over a second side of the pouch and having two long edges and two short edges. In embodiments, the pouch has two long edges each with a length of 0.5 mm to 100 mm, two short edges each with a width of 0.1 mm to 20 mm, and an initial thickness of 0.1 mm to 10 mm. The first and second electrodes cover 50 to 90% of the first and second sides, respectively, of the pouch, and a gap is defined between long edges of the pouch and the first and second electrodes. The method further includes providing a voltage across the enclosed internal cavity between the first and second electrodes at one of the short edges of the first and second electrodes, respectively, such that the first and second electrodes selectively zip together from the one of the short edges toward an opposing one of the short edges.

In embodiments, the method further includes providing a support structure for enabling the actuator to maintain its shape regardless of the voltage provided by the power source. Providing the support structure may include providing at least one of a variable stiffness material, a phase change material, an electrostatic clutch, and a magnet.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 2A illustrates a front view of a miniature HASEL actuator, in accordance with an embodiment.

FIG. 2B shows a side view of the miniature HASEL actuator of FIG. 2A, shown here without an applied voltage, in accordance with an embodiment.

FIG. 2C shows a side view of the miniature HASEL actuator of FIGS. 2A and 2B, shown here with an applied voltage, in accordance with an embodiment.

FIG. 3A illustrates a front view of the miniature HASEL actuator of FIGS. 2A-2C, in accordance with an embodiment, shown here to illustrate details of certain challenges inherent to this particular actuator geometry.

FIG. 3B shows a side view of the miniature HASEL actuator of FIG. 3A, shown here without an applied voltage, in accordance with an embodiment. It is noted that the device illustrated in FIG. 3B is essentially identical to the embodiment shown in FIG. 2B.

FIG. 3C shows a side view of the miniature HASEL actuator of FIGS. 3A and 3B, shown here with an applied voltage to illustrate one possible example of non-uniform actuation, in accordance with an embodiment.

FIG. 12A shows a front view of an actuator pouch and electrodes with a first material forming a portion of the pouch under the electrodes and a second material in the remaining area of the pouch that is not covered by the electrodes, in accordance with an embodiment.

FIG. 12B shows a side view of the actuator pouch and electrodes of FIG. 12A, in accordance with an embodiment, shown here without a voltage applied thereto.

FIG. 12C shows a side view of the actuator pouch and electrodes of FIGS. 12A and 12B, in accordance with an embodiment, shown here in an activated state with a voltage applied thereto.

FIG. 18A shows an actuator at rest, with no applied voltage, in accordance with an embodiment.

FIG. 18B shows the actuator of FIG. 18A with a non-zero voltage applied thereto such that the actuator electrodes are partially zipped together, in accordance with an embodiment.

FIG. 18C shows the actuator of FIGS. 18A and B, shown here with sufficient voltage applied thereto such that the electrodes are fully zipped together, in accordance with an embodiment.

FIG. 18D shows a graph of the stroke as a function of capacitance for the actuator illustrated in FIGS. 18A-18C, shown here to illustrate the relationship between the applied voltage, resulting capacitance, and stroke values, in accordance with an embodiment.

FIG. 19A shows the same activated actuator as that shown in FIG. 18C, shown here with a force $F_3$ applied thereto, in accordance with an embodiment.

FIG. 19B shows the activated actuator of FIG. 19A, this time with a larger force $F_2$ applied thereto.

FIG. 19C shows the activated actuator of FIGS. 19A and B, shown here with a still larger force $F_1$ applied thereto.

FIG. 19D shows a graph of the stroke as a function of capacitance for the actuator illustrated in FIGS. 19A-19C, shown here to illustrate the relationship between the applied force, resulting capacitance, and stroke values.

FIG. 24A shows an actuator including a C-shaped electrode configuration, in accordance with an embodiment.

FIG. 24B shows an actuator including an oval-shaped electrode configuration, in accordance with an embodiment.

FIG. 24C shows an actuator including a half moon-shaped electrode configuration, in accordance with an embodiment.

FIG. 25A shows an actuator including an alternative pouch configuration, in accordance with an embodiment.

FIG. 25B shows an actuator including another alternative pouch configuration, in accordance with an embodiment.

FIG. 25C shows an actuator including yet another alternative pouch configuration, in accordance with an embodiment.

FIG. 26A shows an actuator including a reinforcement material covering substantially all of the pouch and electrode arms, in accordance with an embodiment.

FIG. 26B shows an actuator partially covering the pouch and electrode arms, in accordance with an embodiment.

Figure 1A:
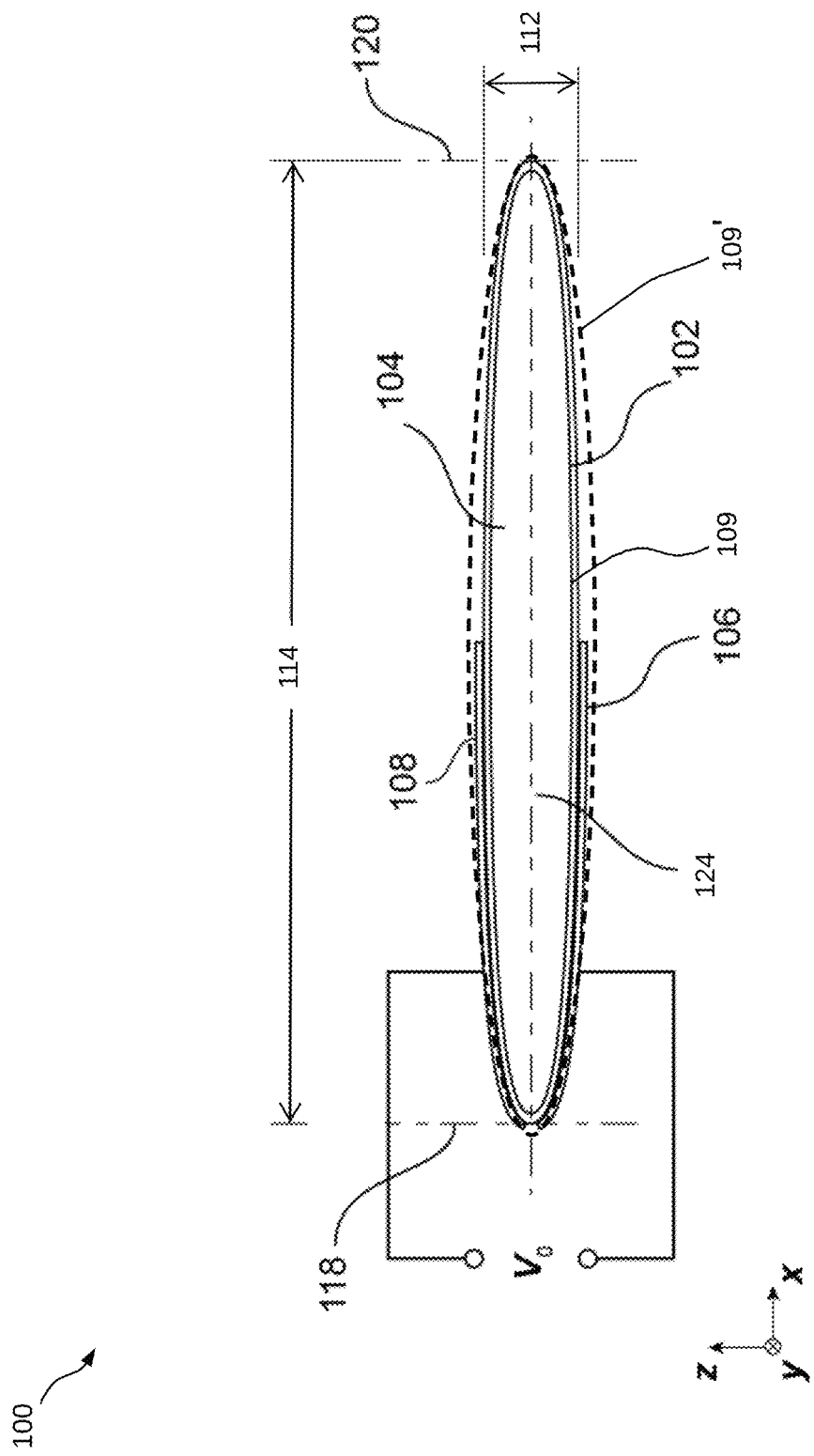
FIG. 1A illustrates a simplified cross section of a hydraulically amplified soft electrostatic (HASEL) actuator at rest, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "compromising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Miniature soft hydraulic electrostatic zipping actuators, such as Hydraulically Amplified Self-Healing Electrostatic (HASEL) actuators, are presented. These actuators feature a geometry with large length to width ratio to achieve large actuation strain in a limited volume. Specific features are described which improve the zipping performance in this form factor. These actuators can also be coupled to mechanical components that amplify force and/or stroke. Modifications to the actuator structure or additional components can improve actuator holding force. A few specific applications are described herein.

Motivation for Miniature HASEL Actuators

Actuators are key components for a range of applications. Traditional actuators rely on a series of a mechanical components to convert electrical energy into mechanical energy. Electromagnetic actuators are the most common and typically rely on some additional mechanical component to convert rotational motion into a linear movement or gearboxes to achieve a suitable torque and speed for angular movement. These systems can be bulky and require expensive precision components that are not a good fit for all applications. Alternative technologies are needed for applications that have limited volume and may only require small displacements and force. So-called "smart material" actuators are commonly used for these applications. These actuator technologies typically consist of a material or combination of materials that change shape under an applied stimulus.

Piezoelectric actuators are a common "smart material" actuator that changes shape in the presence of an applied electric field. Force output is often on the order of 1 N or less, but much larger forces can be achieved with larger volumes. Actuation strain for piezoelectric actuators is limited to less than 0.1%, which would require a 1 m long actuator to achieve 1 mm stroke. Stroke can be amplified by using the actuators to bend a beam, however this amplification of stroke comes at the expense of force and stroke is still limited to ~1 mm. Additionally, piezoelectric actuators require specialty materials which exhibit the piezoelectric effect. These are ceramics, which are brittle, and often include lead which is a hazardous material.

Hydraulically amplified soft electrostatic (HASEL) actuators are an alternative to these piezoelectric actuators as well as other actuators intended for applications with limited space. While actuation stress for a HASEL actuator is lower than piezo actuators, the actuation strain of a HASEL actuator can be >100%. As a result, these actuators are promising for applications requiring relatively large actuation strain, but in a limited volume.

Specific geometries of HASEL actuators, such as large length to width ratios, and the specific configurations of electrodes help achieve uniform electrostatic zipping and large actuation strain in a small actuation volume. Additional components can also be utilized to amplify movement or force. The following paragraphs and figures describe several geometries for miniature actuators, mechanical systems to improve performance, and their application.

The appended drawings illustrate only some implementation and are therefore not to be considered limiting of scope.

Basic Structure of Actuators

FIG. 1A illustrates a cross-sectional view of an exemplary structure of a HASEL actuator 100, shown without a voltage applied thereto. A flexible shell or pouch 102 defines an enclosed internal cavity that is filled with a liquid dielectric 104. For instance, flexible shell 102 may be formed of one or more dielectric material that is inextensible and/or elastically deformable. A first electrode 106 is disposed over a first side of the enclosed internal cavity and a second electrode 108 is disposed over a second side of the enclosed internal cavity opposite the first side. As shown in FIG. 1, first and second electrodes 106, 108 are disposed on opposing sides of shell 102, extending toward the tapered end of the shell, in an example.

In certain embodiments, an outer encapsulation layer 109, which may include a dielectric coating, may provide electrical insulation or protect the actuator from mechanical wear and tear. In embodiments, outer encapsulation layer 109 may be stretchable or flexible and may be provided with varying thicknesses. The outer encapsulation layer may also include a combination of materials, such as a liquid with an elastomer or polymer outer layer to contain the liquid therein. In embodiments, an outer encapsulation layer may be deposited over the electrodes, thus encapsulating the entire actuator structure, as indicated by a dashed oval 109'. Such an implementation may be configured to additionally provide electrical insulation properties for the actuator.

In an initial state where an applied voltage $V_0$ is null or small, flexible shell 102 may exhibit an initial thickness 112 and length 114.

While FIG. 1A illustrates a cross-sectional view of an exemplary, basic HASEL structure, a variety of shapes may be formed with the equivalent combination of a flexible shell, dielectric fluid, and electrodes. For example, three-dimensional circular pouch shapes may be formed by revolving this cross-section around an axis at either a left boundary 118 or a right boundary 120, as an example. Likewise, this cross section can be extruded in a direction that is normal to the page to form a rectangular or oval pouch shape. Other pouch shapes may be contemplated based on this basic configuration where part of a flexible shell is covered by a pair of electrodes positioned on opposing sides of the flexible shell.

Multiple flexible shells 102 may be positioned adjacent to each other or connected together, such as at either left boundary 118 or right boundary 120, to form a multi-pouch actuator in a horizontal direction (i.e., x or y direction as shown in FIG. 1). Likewise, flexible shells may be stacked in the z direction to create a multi-pouch actuator stack. Pouch length 114 may be varied depending on the application and desired performance.

For instance, a pouch length ranging from 0.5 mm to 100 mm may be contemplated. As an example, initial thickness 112 may range from 0.1 mm to 10 mm. The length of each one of electrodes 108 and 106 is typically a fraction of pouch length 114 and may range from 10% to 90% of pouch length 114. As will be discussed in more detail below, dimensions of the pouch, the volume of dielectric liquid fill, the number of stacked or connected pouches, specific materials used to form the actuator, and other factors all influence the performance of the actuator system.

Flexible shell 102 may be made from one or more dielectric and non-dielectric layers with various thicknesses, in certain embodiments. A suitable polymer film for forming flexible shell 102 may include biaxially-oriented films such as polyester, polyethylene terephthalate, and polypropylene. Other suitable films may include polyvinylidene fluoride (PVDF), co-polymers, terpolymers (e.g., poly(vinylidene fluoride-trifluoroethylene-chlorotrifluoroethylene) (P(VDF-TrFE-CTFE)), polytetrafluoroethylene (PTFE), and thermoplastic polyurethane (TPU)). In certain embodiments, films with a dielectric permittivity greater than 2 and dielectric strength greater than 30 kV/mm may be selected. Films may be doped with nanoparticles such as titanium dioxide, barium titanate, and other semiconductor materials to increase permittivity and therefore increase actuator performance. Thickness of the film forming flexible shell 102 may be less than 50 μm, for example. Flexible shell 102 may be formed of multiple layers of dielectric materials to increase dielectric performance. Additionally, layers for providing improved mechanical performance may be laminated with the dielectric layer of the flexible shell. Flexible shell 102 may be formed from a variety of techniques including, and not limited to, heat-sealing, ultra-sonic sealing, adhesives, plasma treatment, laminating, and laser sealing.

Liquid dielectric 104 may include one or more fluids such as natural esters (e.g., FR3® natural ester dielectric fluid from Cargill, Inc.), silicone oils, and mineral oils to name a few. The fluid may be doped with nanoparticles such as titanium dioxide, barium titanate, and other semiconductor materials to increase permittivity and therefore influence actuator performance, in certain embodiments. In some embodiments, liquid dielectric 104 may be a dielectric gas or combination of gas and liquid. Volume of liquid within a pouch generally depends on pouch length and desired thickness and may range from 0.01 mL to 10 mL in each pouch. The actual volume of the liquid dielectric may be adjusted in accordance with desired performance, as discussed in further detail below.

Electrodes 106 and 108 may be selected from a number of conductive materials that may be applied by various processes. Electrodes may be flexible and stretchable, or in some cases fully or partially rigid. Possible materials include metallized films that are vacuum deposited onto flexible shell 102, screen-printed conductive inks, conductive elastomers, metals, and conductive polymers.

Figure 1B:
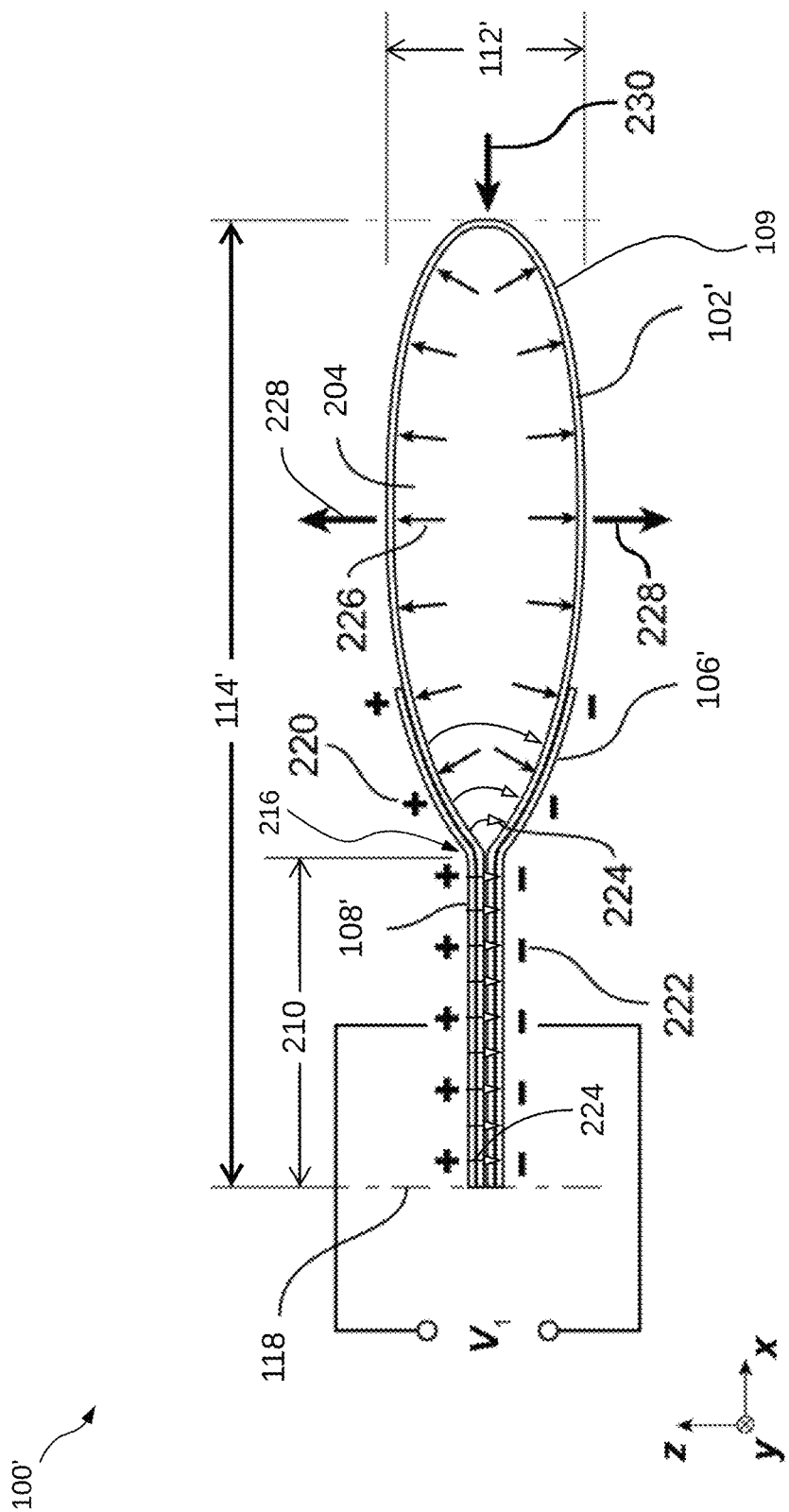
FIG. 1B illustrates a simplified cross section of a HASEL actuator at an intermediate voltage with electrodes partially zipped, in accordance with an embodiment.

FIG. 1B illustrates a simplified cross section of a HASEL actuator at an intermediate voltage with electrodes partially zipped, in accordance with an embodiment. In particular, FIG. 1B illustrates a version 100' of actuator 100 of FIG. 1A with a non-zero voltage $V_1$ applied such that a portion of electrodes 106' and 108' have zipped together in a portion 210 to push fluid 104 within shell 102' and thickness 112' has increased and length 114' has decreased compared to the original thickness 112 and length 114.

In other words, applied voltage $V_1$ causes charges 220, 222 of opposing polarity to flow onto electrodes 106' and 108'. Charges 220, 222 act to induce an electric field 224 (represented by white-headed arrows) through flexible shell 102' and liquid dielectric 104. Electric field 224 is generally concentrated through portion 210 where the electrodes have zipped together and through liquid dielectric 104 at the edge of a tapered boundary 216 where electrodes 106' and 108' are closest together. This concentration of electric field 224 causes the tapered region to experience a high electrostatic stress and, in response, electrodes 106, 108 zip or move closer together. As the electrodes zip together along portion 210, liquid dielectric 104 is displaced to the portion of flexible shell that has not zipped together. This displacement causes flexible shell 102 to deform such that a hydrostatic pressure 226 (indicated by arrows) of liquid dielectric 104 increases. The increased internal hydrostatic pressure 226 combined with the deformation of flexible shell 102' imparts an expanding force in the vertical direction and a contracting force in the horizontal direction (indicated respectively by thick arrows 228 and 230, respectively). These forces and shape change may be used for performing mechanical work on external objects or surfaces.

Figure 1C:
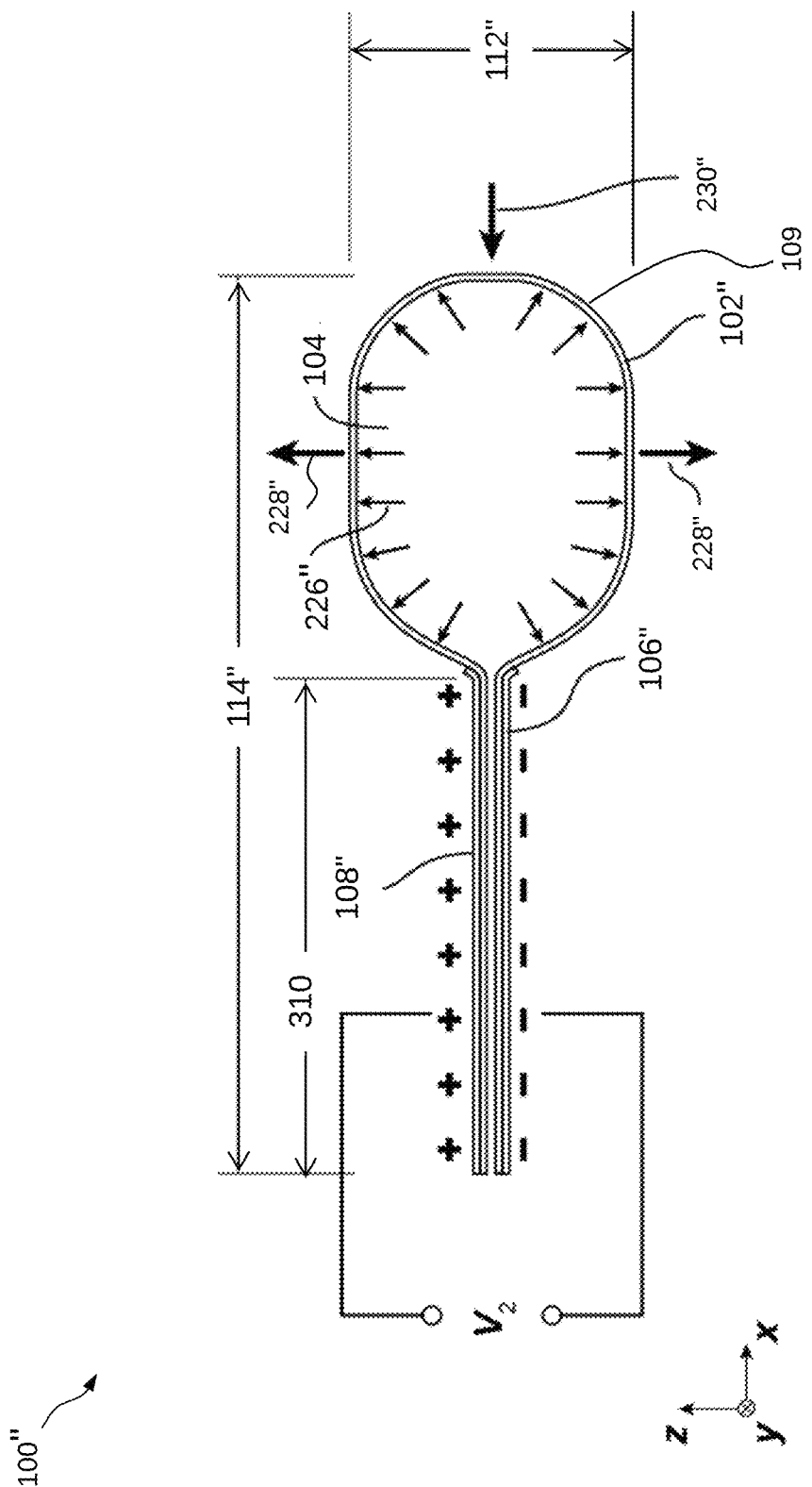
FIG. 1C illustrates a simplified cross section of a HASEL actuator at a maximum voltage with electrodes fully zipped, in accordance with an embodiment.

FIG. 1C illustrates a simplified cross section of the HASEL actuator of FIGS. 1A and 1B at a maximum voltage with electrodes fully zipped, in accordance with an embodiment. Particularly, FIG. 1C shows actuator 100" with voltage $V_2$ applied thereto, where $V_2$ is greater in magnitude than $V_1$ and is sufficient for complete zipping together of the electrodes. In this case, electrodes 106", 108" have fully zipped together, substantially from edge to edge. Liquid dielectric 104 contained in flexible shell 102" has been displaced to the portion of the pouch not covered by electrodes, which causes the pouch to further deform and increases the value of hydrostatic pressure 226". Consequently, length 114" is reduced to a minimum value and thickness 112" increases to a maximum value for the given configuration. Likewise, expanding force 228" and contracting force 230" increases, compared to expanding force 228 and contracting force 230 of FIG. 1B. It is noted that, although FIGS. 1B and 1C are shown with a polarity with positive charges shown on top electrode (i.e., electrode 108', 108"), the symmetry of the actuator is such that the polarity of the applied voltage may be reversed, in embodiments.

Pouch length 114 may vary depending on the application and desired performance. Length 112 may range from 0.5 mm to 100 mm for a single pouch. Initial thickness 116 may range from 0.1 mm to 10 mm. Electrode length 114 is typically a fraction of the overall pouch length 112 and ranges from 10% to 90% of the overall pouch length 112.

The present disclosure focuses on pouches with overall length ranging from 10-70 mm. Initial thickness of the actuator may range from 0.1 mm to 2 mm. In embodiments, electrode length 114 may vary from 40%-90% of the overall pouch length. For example, actuator width may range from 1 mm to 10 mm and is a fraction of the overall pouch length.

Geometry for Miniature Soft Hydraulic Electrostatic Zipping Actuators

As described above, the dimensions of previously available HASEL actuators are on the order of a few centimeters in both length and width. It is recognized herein that very thin actuators with widths less than 10 mm may be desirable in certain embodiments. That is, in certain applications, it would be desirable to reduce the overall size of the HASEL-type actuator while maintaining force-stroke performance.

Examples of specific geometries to enable large actuation strain in miniature form factors are described herein. To achieve large actuation strain at these smaller scales, a specialized geometry with a large length-to-width ratio, as shown in FIGS. 2A-2C, may be particularly effective, in accordance with an embodiment.

FIG. 2A shows a front view of a miniature HASEL actuator 200, in accordance with an embodiment. As shown in FIG. 2A, miniature HASEL actuator 200 includes a liquid filled pouch addressed via electrodes disposed on opposing sides of the pouch. Pouch width may range from 1 mm to 10 mm, while pouch length may be in a range of 10-70 mm. In certain examples, the pouch length may be similar to pouch width. To achieve large displacement (e.g., 2× to 6× the original pouch thickness at rest), electrode length may be 40 to 90% of the overall pouch length. In certain embodiments, a skirt surrounding the pouch may help prevent arcing between electrodes of opposite side. For example, the skirt area may be formed of excess material from the same sheets forming the pouch. In some cases, the skirt may not be needed depending on the voltage used, operating environment, and/or addition of an external dielectric coating on and around the actuator.

FIGS. 2B and 2C show side views of miniature HASEL actuator 200 without applied voltage (FIG. 2B) and with applied voltage (FIG. 2C), in accordance with embodiments. With applied voltage, at least a portion of the electrodes zip together along a zipped length (shown by double-headed arrows in FIG. 2C). As a result, the liquid dielectric within the pouch is pushed out of the zipped length and toward the bottom of the pouch such that the thickness of the actuator changes from initial thickness to an actuated thickness, with a corresponding reduction in pouch length as shown in FIGS. 2B and 2C.

In an exemplary embodiment, the initial thickness of the actuator may range from 0.1 to 2 millimeters. Further, the strain, calculated as a change in thickness ($\Delta t$) divided by the initial thickness (t) times 100 to be expressed as a percentage value, in the thickness direction may vary from 0.1% to 300%, with even higher values possible (e.g., as high as 500%). In embodiments, a 6× increase in thickness would correspond to a 500% strain. The strain in the length direction may be calculated in a similar way, as a change in length ($\Delta L$) divided by the initial length L times 100 to be expressed as a percentage value. As a result, assuming an initial thickness of 0.1 to 2 mm, the actuated thickness may be as high as 0.6 to 12 mm. The strain generated in the length direction is generally smaller, at approximately 0.1 to 5%. In this way, since the actuated thickness is a function of the zipped length of the electrodes, the relatively long electrodes allow for precise control of force and/or stroke of the actuator, particularly in the thickness direction.

FIGS. 3A-3C illustrate details of certain challenges inherent to the actuator geometries as idealized in FIGS. 2A-2C. As shown in FIG. 3A, unlike in the macro-scale HASEL actuator configurations as shown in FIGS. 1A-1C, the zipping angle between the electrodes along the pouch length is low such that the zipping action may start in different directions. As a result, whereas the actuator at rest as shown in FIGS. 2B and 3B are essentially identical, application of voltage may result in non-uniform actuation in certain cases, as visible by comparing FIGS. 2C and 3C, even if applied $V_1$ (of FIG. 2C) is substantially equal to $V_1'$ (of FIG. 3C). This effect may be particularly pronounced in miniature HASEL actuators, in which the distances between the electrodes are closer together than in standard, macro-sized HASEL actuators.

Figure 4:
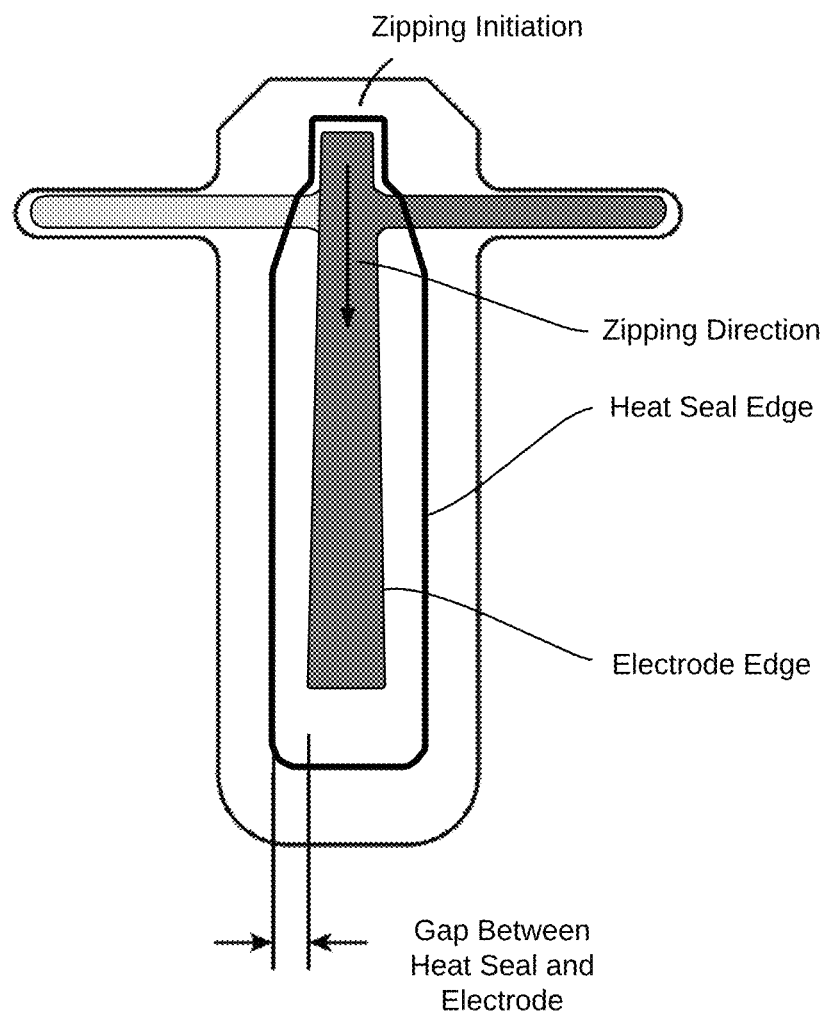
FIG. 4 shows a front view of a miniature HASEL actuator including a gap between the edge of the pouch and the electrode, in accordance with an embodiment.

The issue of non-uniform zipping may be addressed in different ways. A first way is to design the shape of the pouch and the electrode such that a gap between the edge of the heat seal forming the pouch and the edge of the electrode is integrated into the design, as shown in FIG. 4. The gap may be implemented, for instance, by widening the pouch outline (as shown in FIG. 4) or by further narrowing the electrode.

The gaps on either side of the electrode along the long edges of the electrode and pouch allows control of the zipping action to prevent the zipping action from initiating on the two length sides of the electrode. In this case, the zipping initiates on the short end of the electrode, as indicated in FIG. 4 as zipping initiation. In examples, the gap between the length sides of the electrode and the pouch edge may be 1 mm or more in width. While this approach may be effective in certain applications, this "dead" space along the length of the electrode may result in the liquid dielectric being pumped into these regions as the electrodes are zipped together.

Figure 5:
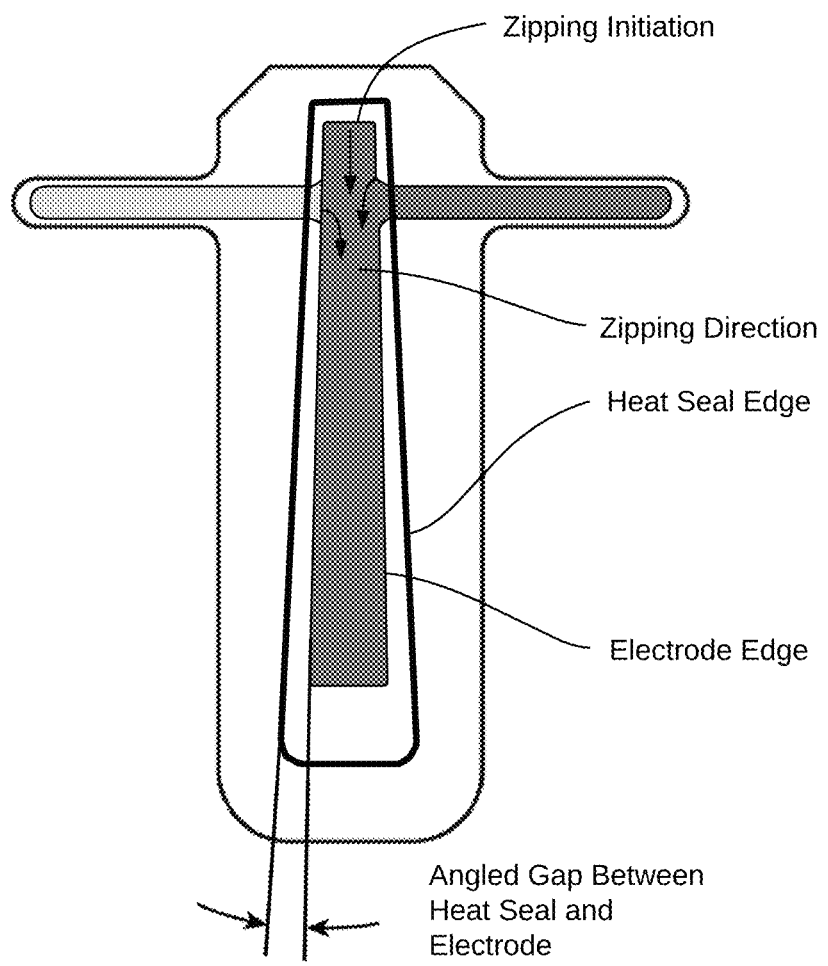
FIG. 5 shows a front view of a miniature HASEL actuator including an angled gap between the edge of the pouch and the electrode, in accordance with an embodiment.

Another approach to address the issue of non-uniform zipping is shown in FIG. 5. As shown in FIG. 5, the long edges and the heat seals forming the pouch are angled with respect to each other such that they are not parallel, e.g., at an angle of 2 to 10 degrees, for example. In this case, the zipping generally initiates at the short end of the electrode and at the corners, as indicated in FIG. 5. This design thus increases the zipping initiation points while discouraging non-uniform zipping.

Further, the use of anisotropic materials with greater bending stiffness along the width direction compared to the length direction may also be used to control the zipping uniformity. For example, the anisotropic material may directly be used as the film forming the pouch, as an additional coating formed on the pouch, or as a separate, additional layer provided on top of or within the pouch.

Using Lever Arms to Modify Performance

To meet the needs of different applications, there may be a need to increase the force or stroke output of the miniature HASEL actuators. Known direct methods to increase force and stroke include increasing the number of actuators in an array to increase force for a given stroke, or to stack multiple actuators to increase stroke for a given force.

Additionally, the dielectric properties of the actuator materials in the electrode region can be altered to improve performance. For example, higher permittivity dielectric films will increase the electromechanical response of the actuators.

In addition to intrinsic changes to the actuator, particularly miniature HASEL actuators are amenable for coupling with mechanisms that provide a mechanical advantage to either increase force or stroke.

Figure 6A:
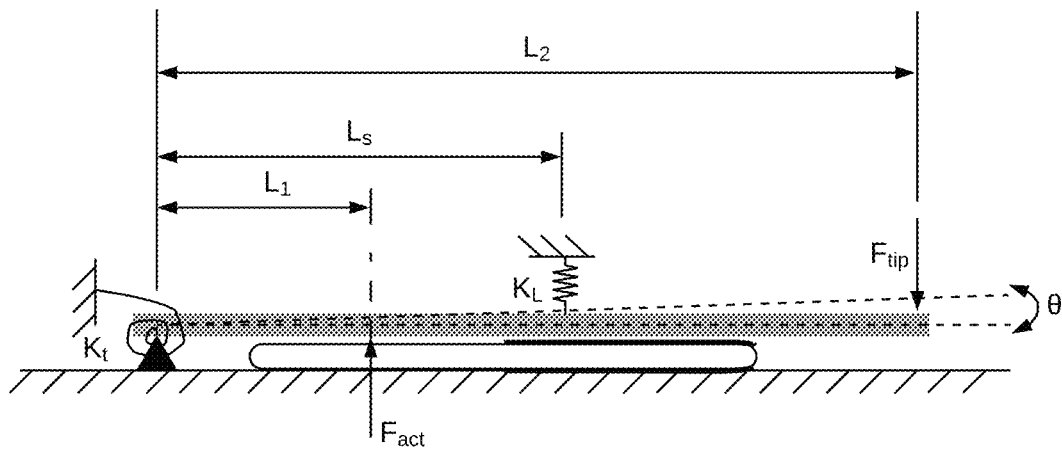
FIG. 6A shows a side view of an actuator system including an actuator coupled with a lever arm, in accordance with an embodiment.
Figure 6B:
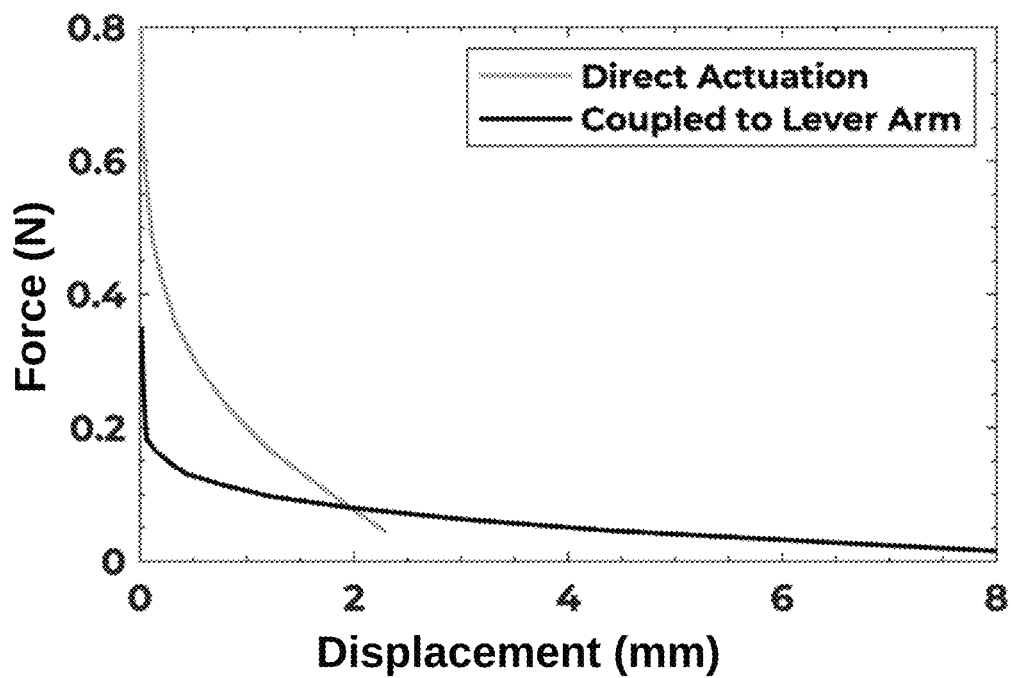
FIG. 6B is a graph of the force-stroke performance of the actuator system of FIG. 6A.

FIGS. 6A and 6B show the structure and a graph of the force-stroke (i.e., displacement) performance of an actuator coupled with a lever arm, in accordance with an embodiment. A lever, with length $L_2$, is placed adjacent a HASEL actuator. The actuator is oriented with respect to the lever such that, when activated, the actuator applies a force to the lever at a distance $L_1$ with respect to a pivot point (indicated by a dark triangle). It should be noted that $L_1$ is not a fixed distance and may change during actuation. Additionally, the force applied by the actuator, $F_{act}$, is not a point force, but is a force that is distributed along the length of the actuator shell/pouch that is in contact with the lever. For simplicity, $F_{act}$ is shown as a point force.

As may be seen in FIG. 6A, the lever rotates about the pivot point during actuation to an angle θ. Spring elements, such as a torsional spring ($K_t$) placed at the pivot point or a linear spring ($K_t$) provided at a distance $L_s$ from the pivot point, may be used to additionally provide a restoring force or preload to the actuator-lever configuration.

It is noted that the configuration shown in FIG. 6A is commonly referred to as a "Class 3" lever, wherein the displacement produced by the actuator is amplified at the tip of the lever by a ratio $L_2/L_1$. This amplification of displacement come with a decrease in force at the lever tip (i.e., $F_{tip}$), the decrease being proportional to $L_1/L_2$. In this way, this actuator configuration of FIG. 6A provides an approach toward amplifying the displacement at the cost of force output. FIG. 6B shows a force vs. displacement curve for direct actuation provided by the actuator itself compared with performance of the actuator when coupled with the lever arm as shown in FIG. 6A.

Figure 7A:
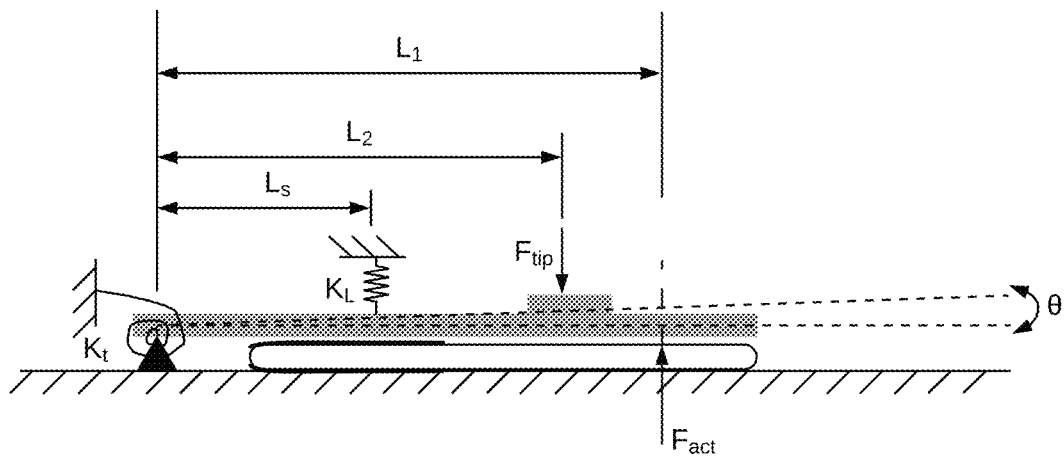
FIG. 7A shows a side view of another actuator system including an actuator coupled with a lever arm, in accordance with an embodiment.

FIG. 7A shows another example of a HASEL actuator coupled with a lever, in accordance with an embodiment. In this case, the actuator is oriented such that the force from the actuator ($F_{act}'$) is applied at a location at a distance $L_1'$ from the pivot point (again indicated by a dark triangle). In the case shown in FIG. 7A, $L_1'$ is farther from the lever pivot point than the applied load $F_{tip}'$. This configuration is commonly referred to as a "Class 2" lever.

Figure 7B:
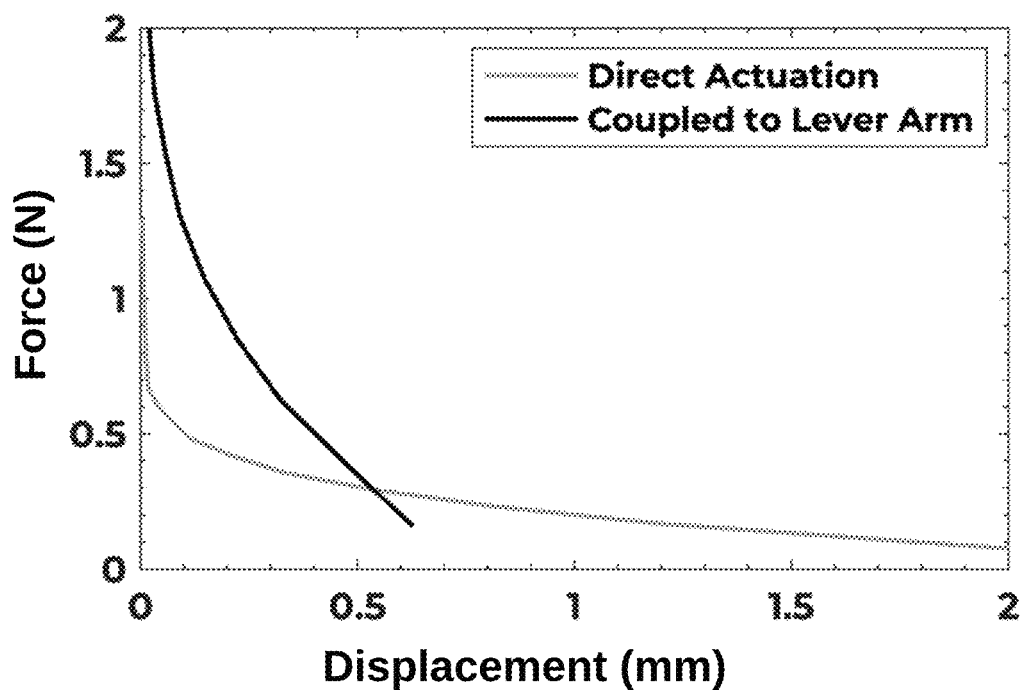
FIG. 7B is a graph of the force-stroke performance of the actuator system of FIG. 7A.

FIG. 7B shows a force vs. displacement curve for direct actuation with the actuator compared with the performance of the actuator when coupled to a Class 2 lever as shown in FIG. 7A. As may be seen in FIG. 7B, the performance trend of the actuator with direct actuation versus with the lever arm is reversed in FIG. 7B compared to the configuration in FIG. 7A. However, it is noted that the force provided by the Class 2 lever configuration of FIG. 7A and shown in FIG. 7B is higher overall as compared to the force of the Class 3 lever configuration illustrated in FIGS. 6A and 6B.

Although it is not shown, this approach may be extended to Class 1 levers, levers with actuators acting at multiple points, or levers with actuators that rotate the lever in multiple directions. The various types of lever configurations may be useful in particular contexts. For instance, specific lever configurations may provide an effective approach to modify the force and displacement of these actuators, such as in cases where space is limited and it is not possible to increase the number of actuators or size of actuators.

Furthermore, lever arms may be used with stacks of actuators as well as combinations of actuators of different sizes or orientations to achieve different force vs. stroke performance. For example, multiple actuators may be provided at different contact points on a single lever arm to be used to selectively achieve the desired force or stroke amplification.

While the lever approaches described above may be useful for achieving analog control of the displacement position at the tip of the lever arm, some applications may only require binary or digital positioning between two distinct points. In such an application, a hard stop may be provided at one or both of the starting and stopping positions such that the lever is manipulated from an OFF position to an ON position, and vice versa. Using, for example, one or more torsion or linear springs, the actuator may optionally be biased to be preferentially in either the ON or OFF position.

Figure 8A:
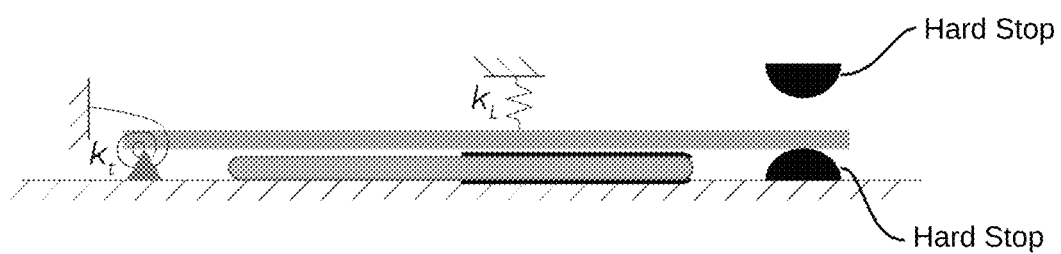
FIG. 8A shows a side view of still another actuator system including an actuator coupled with a lever arm, in accordance with an embodiment.
Figure 8B:
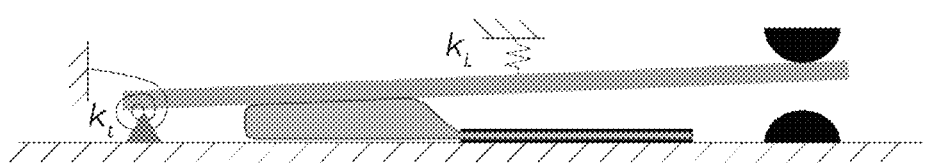
FIG. 8B shows a side view of the actuator system of FIG. 8A, shown here in an activated state, in accordance with an embodiment.

For example, FIGS. 8A and 8B illustrate a lever configuration including a hard stop for both the OFF and ON positions. In the exemplary configuration shown in FIG. 8A, when the actuator is at rest with no voltage applied thereto, gravitational forces act to keep the lever arm at a lower position, adjacent to the lower hard stop. When the actuator is activated, the lever arm is raised to touch the upper hard stop. These hard stops would allow for precise positioning of the lever arm tip without precise control of the input voltage signal. Further, in certain embodiments, the voltage applied to the actuator may be selected to move the lever arm to the upper hard stop as quickly as possible, using, for example, a sharp burst of supplied voltage as opposed to a gradual application of voltage, as may be required when a more refined, analog control of the lever arm placement is desired.

Modifying Flexibility of Electrodes for Controlled Zipping

Additional approaches to increase actuator performance include intrinsic actuator modifications as well as more complex mechanisms, according to embodiments. While these approaches are described in context of the miniature HASEL actuators, it should be appreciated that they can applied to HASEL actuators of different sizes and geometries.

A fundamental operating principle of HASEL actuators is that electrostatic forces cause electrodes to zip together to displace a liquid dielectric within a pouch which increases pressure within the pouch and in turn does mechanical work on an external load. To allow for electrodes to zip together easily, the film and electrode should be flexible. However, the opposite may be true for actuator applications in which the actuator is intended to maintain its state under a load.

It is recognized herein that electrodes that are not flexible or even rigid are more difficult to unzip since they cannot unzip incrementally and the entire length of electrodes must come apart at the same time. As the work required to pull the electrodes apart is proportional to the length of electrodes that must be separated at once, an actuator with inflexible electrodes would have a considerably higher holding force compared to flexible electrodes. Four exemplary approaches to realizing an actuator with such properties are discussing below.

Variable Stiffness Outer Layer

In certain embodiments, it may be desirable to have the pouch portion of actuator maintain its shape with or without an applied voltage. To this effect, additional or alternative structures may be provided to support the activated shape of the actuator.

FIGS. 9A-9D illustrate the operation of an actuator with a variable stiffness and/or phase change material attached to the outer shell, in accordance with an embodiment. This material may be disposed on top of the electrodes or may be used to form the electrodes themselves. The bending modulus for this material may vary in response to stimulus, such as heating from a resistive element embedded in or attached to the material.

A wide range of materials may be used for the variable stiffness material. For example, thermoplastics show a dramatic change in modulus with temperature. Even more dramatic changes in stiffness may be realized with materials that transition in phase (e.g., between solid and liquid) with a relatively low amount of input energy. Such a phase change material may be contained within a separate pouch disposed adjacent to the electrode.

Figure 9A:
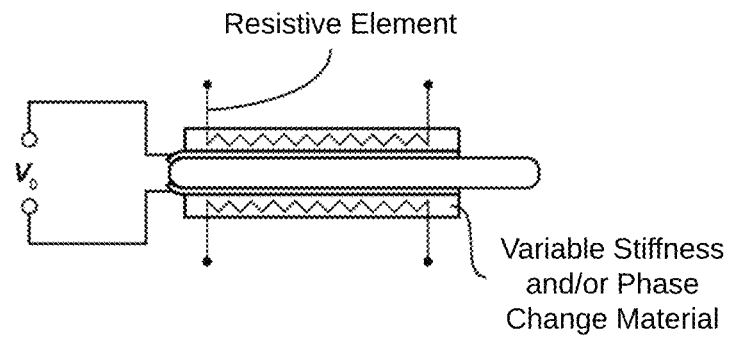
FIG. 9A shows a side view of an actuator with an outer layer integrated therewith, in accordance with an embodiment, shown here in a rest state without an applied voltage.

FIG. 9A shows an actuator with an outer layer integrated therewith, in a rest state before voltage is applied. The outer layer includes a variable stiffness and/or phase change material, integrated with a resistive element integrated, in the illustrated embodiment. In the rest stage, with no current provided to the resistive element, the outer layer exhibits high stiffness.

Figure 9B:
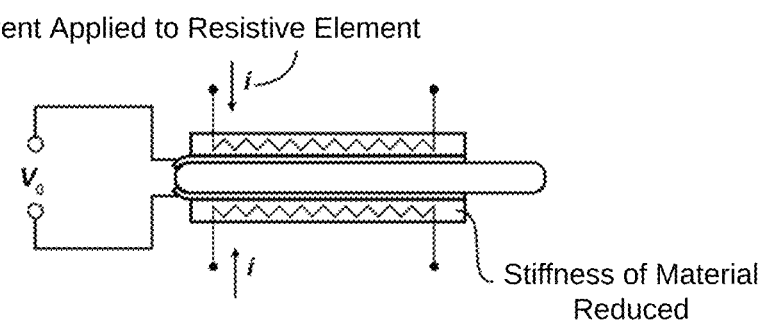
FIG. 9B shows a side view of the actuator of FIG. 9B, shown here with the outer layer activated, in accordance with an embodiment.
Figure 9C:
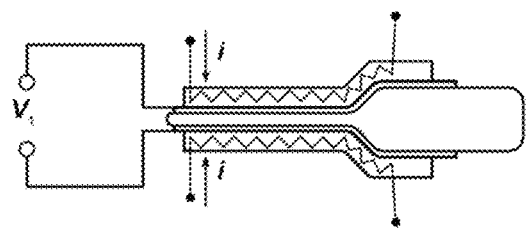
FIG. 9C shows a side view of the actuator of FIGS. 9A and 9B, shown here with both the outer layer activated and a voltage applied across the actuator, in accordance with an embodiment.

In FIG. 9B, a current is supplied to the resistive element, which heats the outer layer to cause a reduction in stiffness. Then, as shown in FIG. 9C, the stiffness reduction in the outer layer allows the electrodes to more easily zip together, as compared to if the outer layer were to maintain stiffness shown in FIG. 9A.

Figure 9D:
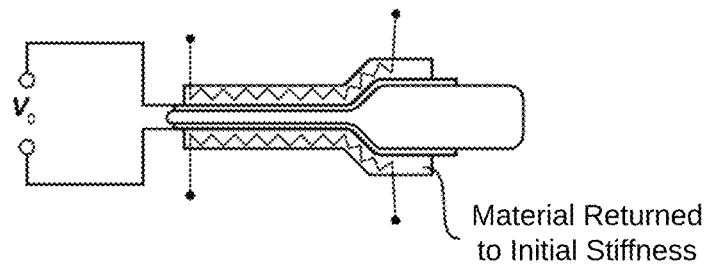
FIG. 9D shows a side view of the actuator of FIGS. 9A-9C, shown here with the outer layer returned to its original stiffer state, in accordance with an embodiment.

When the actuator has reached its desired position, as shown in FIG. 9D, current is removed from the resistive element and the outer layer returns to a stiffer state. In this state, the electrode will tend to hold its shape, thus providing a higher holding force against external loads. In embodiments, if the outer layer is of sufficient stiffness, the actuator may be able to hold its position even when the voltage from the electrodes is again reduced to the rest value.

It should be appreciated that the variable stiffness material may be divided into multiple individually controlled segments along the electrode length. Further, the outer layer on adjacent to each electrode may be addressed individually such that the actuator exhibits a high stiffness on one electrode side while the opposing electrode side is allowed to become flexible, and vice versa. Other variations in controlling the stiffness of the variable stiffness material and/or phase change material are contemplated and are considered to be a part of the present disclosure.

Electrostatic Clutch

Figure 10A:
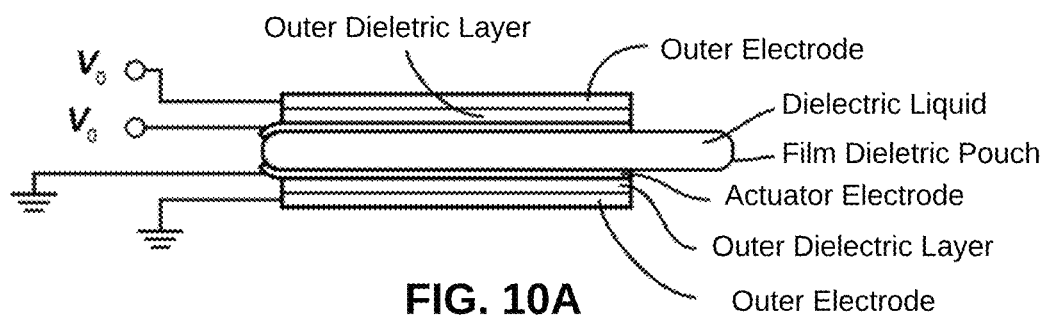
FIG. 10A shows a side view of an electrostatic clutch system, in accordance with an embodiment.
Figure 10B:
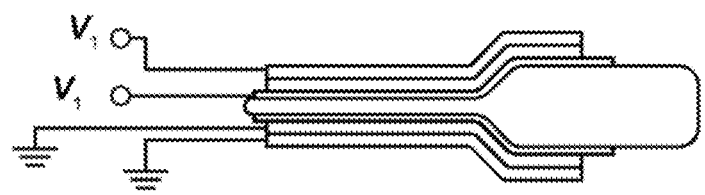
FIG. 10B shows a side view of the electrostatic clutch system of FIG. 10A, shown here with a voltage applied across the actuator electrodes, in accordance with an embodiment.
Figure 10C:
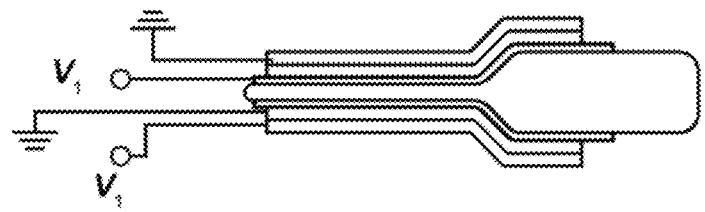
FIG. 10C shows a side view of the electrostatic clutch system of FIGS. 10A and 1013, shown here with the clutch system activated, in accordance with an embodiment.

An alternative method for varying stiffness of the actuator shell is to employ an electrostatic clutch, as shown in FIGS. 10A-10C, in accordance with an embodiment. In an example, an electrostatic clutch includes of a pair of electrodes, such as an outer electrode and one electrode of the actuator, that are separated by a dielectric layer. Applying a voltage across the layers of the electrostatic clutch stiffens the three layers (i.e., an actuator electrode, dielectric layer, and an outer electrode) as they are no longer able to slide relative to each other.

While only three layers are shown here, it is possible to combine several pairs of alternating outer electrode and dielectric layers as clutch layers. Each additional clutch layer would increase the stiffness of the clutch when activated.

For example, as shown in FIG. 10A, no voltage is provided to the outer electrodes and the actuator electrodes such that the electrostatic clutch and the actuator are inactive. In FIG. 10B, a voltage is applied across the actuator electrodes causing the electrodes to partially zip together, while the same voltage is provided across the outer electrodes such that no electric field is applied through the dielectric layer of the electrostatic clutch.

In FIG. 10C, the electrostatic clutch is activated by applying a voltage across each pair of outer and actuator electrodes. While the voltage value applied across the electrostatic clutches is shown to be the same as the voltage applied across the actuator in FIG. 10B, as this configuration would simplify the electronics, a separate high voltage source may be provided for each or both sets of the electrostatic clutch. With the electrostatic clutch engaged, the electrodes are much stiffer and resistant to unzipping, thus increasing a holding force of the actuator.

Again, it should be appreciated that the clutch may be divided into multiple individually controlled segments along the electrode length, each clutch pair may be individually addressed, and other addressing schemes may be contemplated.

Locking into a Zipped State with a Magnet

Figure 11A:
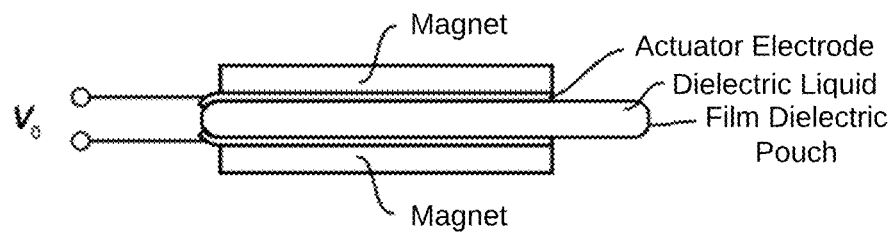
FIG. 11A shows a side view of an actuator system including a magnet arrangement, in accordance with an embodiment.
Figure 11B:
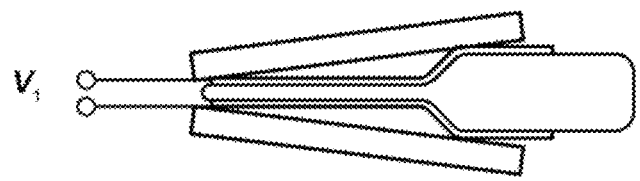
FIG. 11B shows a side view of the actuator system of FIG. 11A, in accordance with an embodiment, shown here with the actuator activated.
Figure 11C:
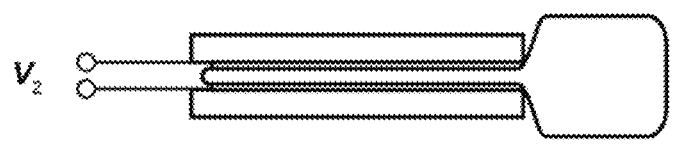
FIG. 11C shows a side view of the actuator system of FIGS. 11A and 11B, in accordance with an embodiment, shown here to illustrate the system with the magnet brought together.

FIGS. 11A-11C illustrate the operation of an actuator with a pair of magnets located as the outer most layer, in accordance with an embodiment. In the rest state as shown in FIG. 11A, when actuator voltage is off, the magnets are sufficiently separated such that the magnetic force is low. As the actuator is activated with the application of a voltage such that the electrodes start to zip together as shown in FIG. 11B, the magnets are closer at one edge thus are attracted to each other, although overall magnetic force is still low. However, once the actuator zips together fully as shown in FIG. 11C, the full length of the magnets are closer together and the magnetic force may be selected to be sufficiently high to prevent or limit unzipping.

It should be appreciated that, while rigid permanent magnets may be used, a similar effect may be achieved with flexible magnetic material. Additionally, an electromagnet may be used in place of a permanent magnet. Further, multiple magnet pairs may be used along the length of the actuator for incremental locking as portions of the electrodes are zipped together.

Materials with Better Dielectric Properties

The overall performance of an actuator may be improved by optimizing material properties in different regions of the actuator. It is recognized herein that the material used in the portion of the actuator pouch under the electrodes should exhibit good dielectric properties, such as high permittivity and high breakdown strength. Further, the segments of the pouch that are not in the portions of the actuator that zip together should exhibit good mechanical properties, such as flexibility and high tensile strength.

These ideal material requirements of the different portions of the actuator may be competing and not be satisfied by a single material. For example, a material with good dielectric properties, such as polyvinylidene fluoride ("PVDF"), may have poor mechanical properties such as low modulus of elasticity. FIGS. 12A-12C illustrate a multi-material actuator, in accordance with an embodiment.

As shown in FIG. 12A, the actuator pouch may be formed of a first material under the electrodes and a second material in the remaining area. For example, a multi-material actuator may use different materials where the material between the electrodes is optimized for dielectric performance while the material in the expanding region is optimized for mechanical properties. In a cross-sectional view shown in FIG. 12B, the portion of the actuator pouch under the electrodes may be formed of a film with good dielectric properties, while the expanding region is formed of a film optimized for the desired mechanical properties. In this way, ideal electrode zipping as well as an ideal actuator pouch expansion (e.g., with a circular cross-sectional shape) may be achieved, as shown in FIG. 12C.

Potential high performance dielectric materials include PVDF, PVDF copolymer, PVDF terpolymer, polyvinyl chloride ("PVC"), polyethylene naphthalate ("PEN"), thermoplastic polyurethane ("TPU"), biaxially-oriented polyamide ("BOPA"), polycarbonate ("PC"). Possible materials with desirable mechanical properties include polyimide, biaxially-oriented polypropylene ("BOPP") and/or polyethylene terephthalate ("PET").

Figure 12D:
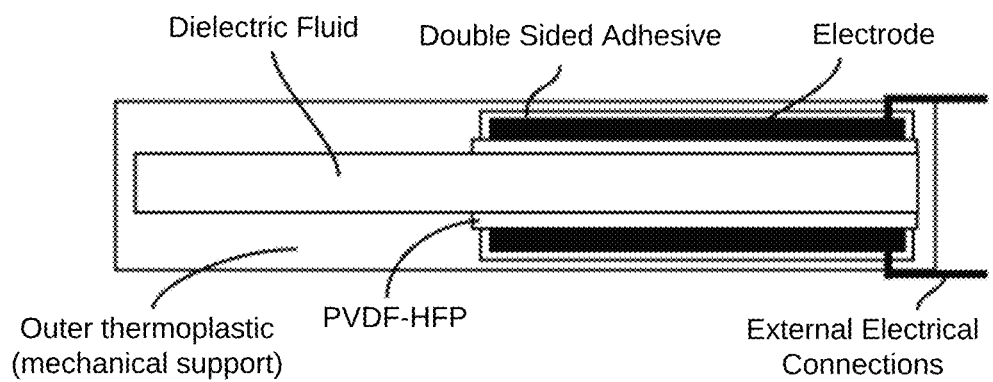
FIG. 12D shows a side view of an actuator pouch with a lamination, in accordance with an embodiment.

It is also possible to use a combination of materials, such as laminating a portion of the pouch with a material with desirable properties. For example, as shown in FIG. 12D, the overall pouch may be formed of a material with good mechanical properties, which is laminated with a high performance dielectric layer, such as a PVDF copolymer. For instance, the layers may be laminated together and bonded with a double-sided adhesive.

Flexural Mechanism for Stroke Amplification

Figure 13A:
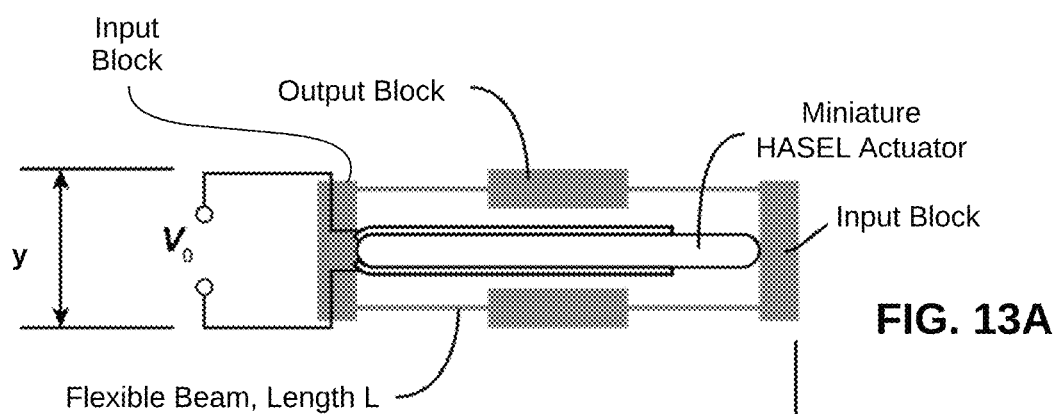
FIG. 13A shows a flexure mechanism including a miniature HASEL actuator, in accordance with an embodiment.
Figure 13B:
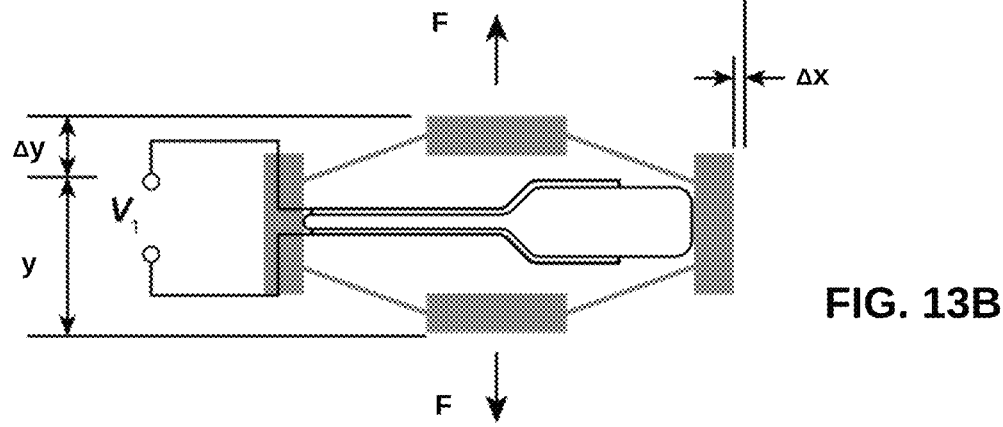
FIG. 13B shows the flexure mechanism of FIG. 13A, in accordance with an embodiment, shown here to illustrate the mechanism in an activated state.

When coupled to a flexural mechanism, the force or stroke of a miniature HASEL actuator may be amplified without the need for moving components that would add system weight and complexity. FIGS. 13A and 13B illustrate the operation of a flexure mechanism including a miniature HASEL actuator, in accordance with an embodiment. As illustrated in FIG. 13A, a flexure includes two input blocks, each of which is connected to either end of a miniature HASEL actuator. The input blocks are connected with output blocks via flexible beams of length L.

As shown in FIG. 13B, activating the actuator with the application of a voltage causes the actuator to contract in the horizontal direction. The flexure then deforms, and the horizontal motion of the input blocks is translated into vertical motion of the output blocks by a distance $\Delta y$.

Applications for Miniature Soft Hydraulic Electrostatic Zipping Actuators

The small dimensions of the miniature HASEL actuators are useful for a variety of applications, some of which are highlighted below. Key applications include, for example, haptic actuators, especially for cases where arrays of actuators are needed in a small area. Valves are another application area for small actuators, since they often need to be small to reduce overall system size. These actuators may also be useful for rough positioning or movement of optical components. In general, applications with limited space would benefit from miniature soft hydraulic electrostatic zipping actuators, as they do not require moving mechanical components or other mechanisms to generate linear or rotational motion.

Figure 14:
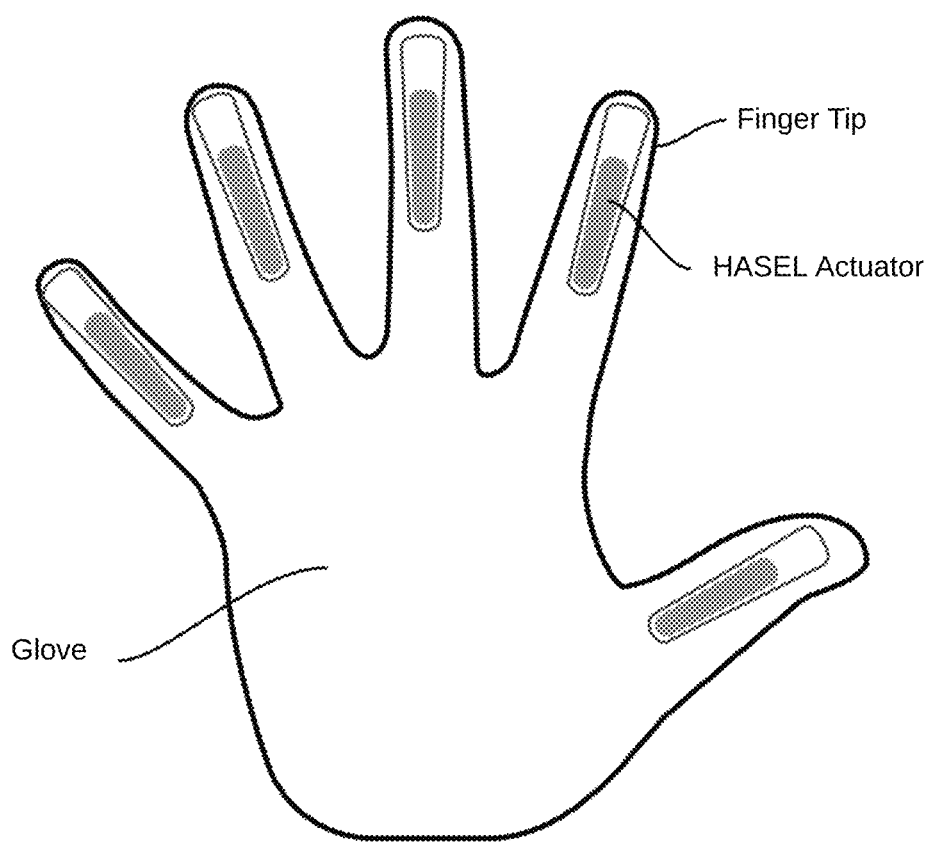
FIG. 14 shows a glove integrating miniature actuators at the fingertips, in accordance with an embodiment.

FIG. 14 illustrates the use of miniature actuators in the fingertip of a glove, in accordance with an embodiment. This system may be useful for vibrotactile feedback and other haptic sensations in virtual reality, augmented reality, Braille, and haptic communication systems. The actuators may be addressed simultaneously or individually with varying force and frequency.

Figure 15A:
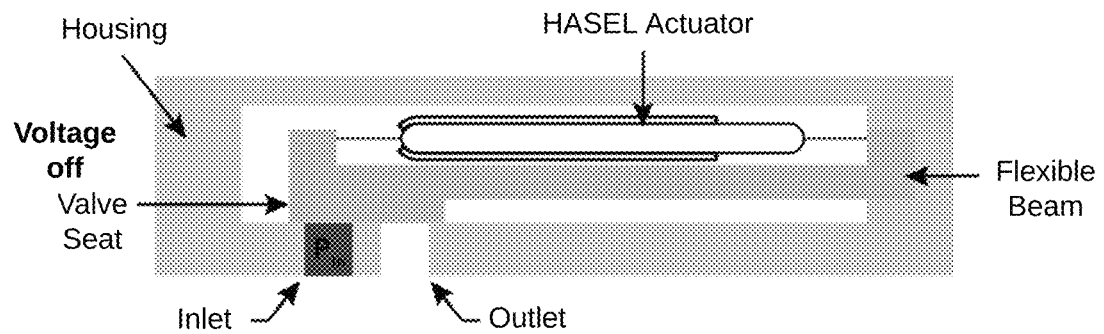
FIG. 15A shows a miniature HASEL actuator integrated into the operations of a valve, in accordance with an embodiment.
Figure 15B:
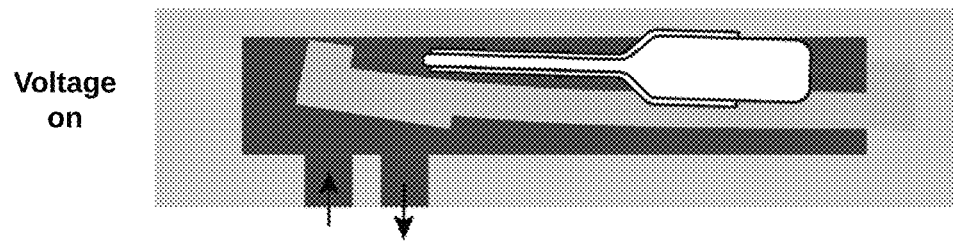
FIG. 15B shows the valve of FIG. 15A, in accordance with an embodiment, shown here to illustrate the valve with the actuator in an activated state.

FIGS. 15A and 15B illustrate the use of a miniature soft hydraulic electrostatic zipping actuator in a valve, in accordance with an embodiment. As shown in FIG. 15A, a miniature HASEL actuator may be coupled with a flexible beam. One side of the beam is configured for serving as a valve seat to close off an inlet and outlet. When activated, the miniature HASEL actuator contracts in length, which causes the flexible beam to bend upward and opens the ports for the inlet and outlet, as shown in FIG. 15B. The displacement of the beam may be varied with the applied voltage. It should be noted that, while one inlet and one outlet are shown in FIGS. 15A and 15B, different numbers and combinations of ports may be implemented with this type of valve.

Figure 16A:
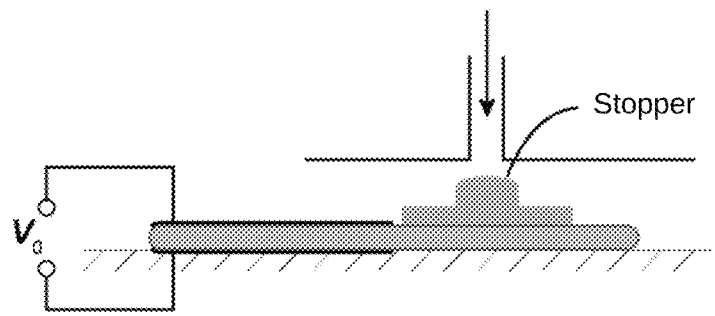
FIG. 16A shows another embodiment of a valve with an integrated miniature actuator.
Figure 16B:
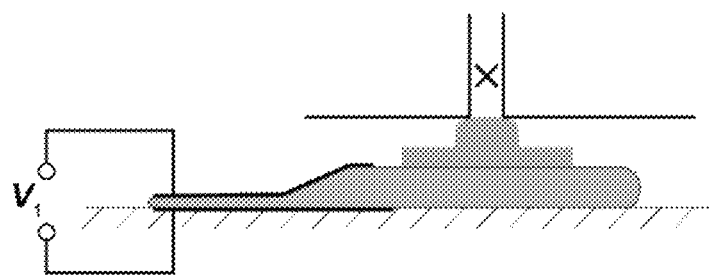
FIG. 16B shows the valve of FIG. 16A with the actuator in an activated state.

FIGS. 16A and 16B illustrate a simple version of another configuration of a valve based on a miniature soft hydraulic electrostatic zipping actuator, in accordance with an embodiment. As shown in FIG. 16A, a stopper is mounted on top of a miniature HASEL actuator. When voltage V1 is applied at the actuator as shown in FIG. 16B, the actuator expands and the stopper is pressed against an opening to block flow from the inlet.

Self-Sensing with Miniature Soft Hydraulic Electrostatic Zipping Actuators

Figure 17A:
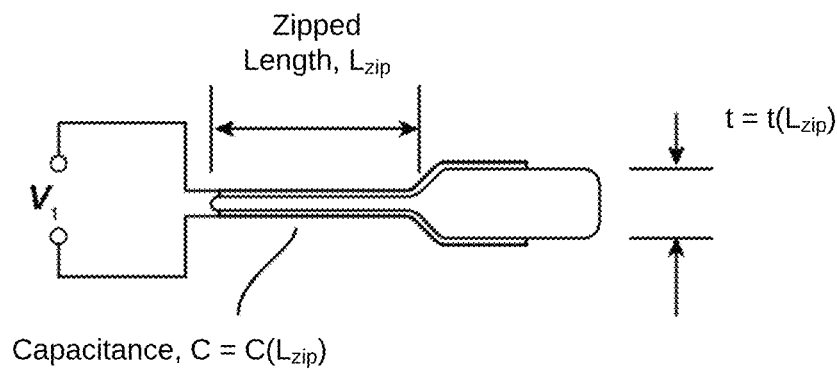
FIG. 17A shows a self-sensing actuator, in accordance with an embodiment.
Figure 17B:
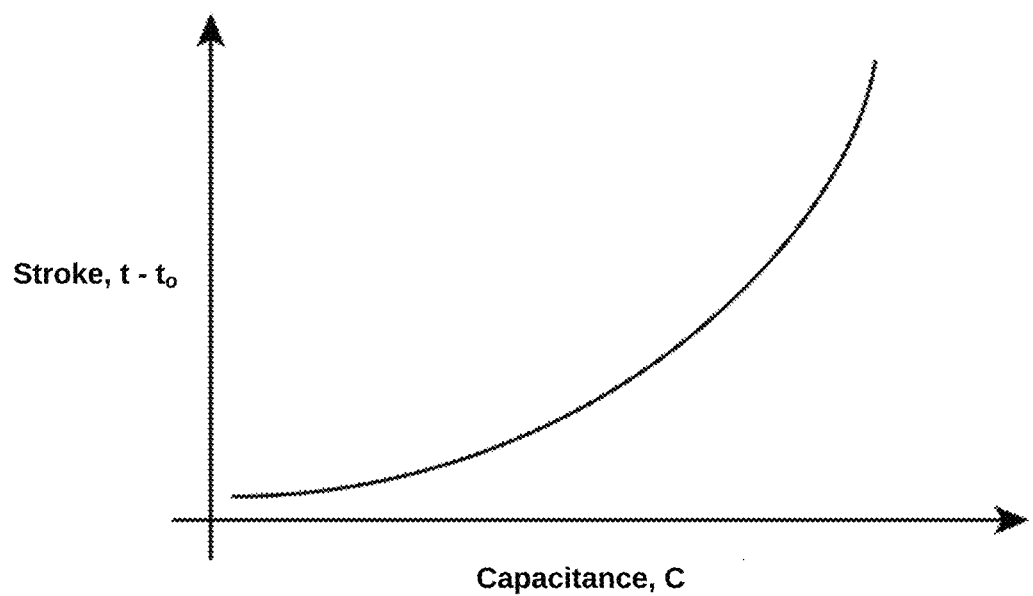
FIG. 17B shows a graph of the stroke as a function of capacitance for the self-sensing actuator of FIG. 17A.

In an embodiment, the zipped electrodes of a HASEL actuator form a variable capacitor where capacitance is a function of the electrode width and zipped length, as shown in FIG. 17A in accordance with an embodiment. Since the thickness of the actuator is also a function of the zipped length, $L_{zip}$, the capacitance of the actuator can be directly mapped to actuator stroke, as shown in FIG. 17B. In this way, the HASEL actuator can serve as a sensor or as a self-sensing actuator by monitoring capacitance of the electrodes.

In practice, this configuration implies that, for a given load, the effective capacitance will increase with increasing voltage, as visually indicated in FIGS. 18A-18D. In other words, for a fixed voltage, capacitance will decrease with increasing load, as visually indicated in FIGS. 19A-19D.

Pumping Fluid with Miniature Soft Hydraulic Electrostatic Zipping Actuators

Figures 20A, 20B:
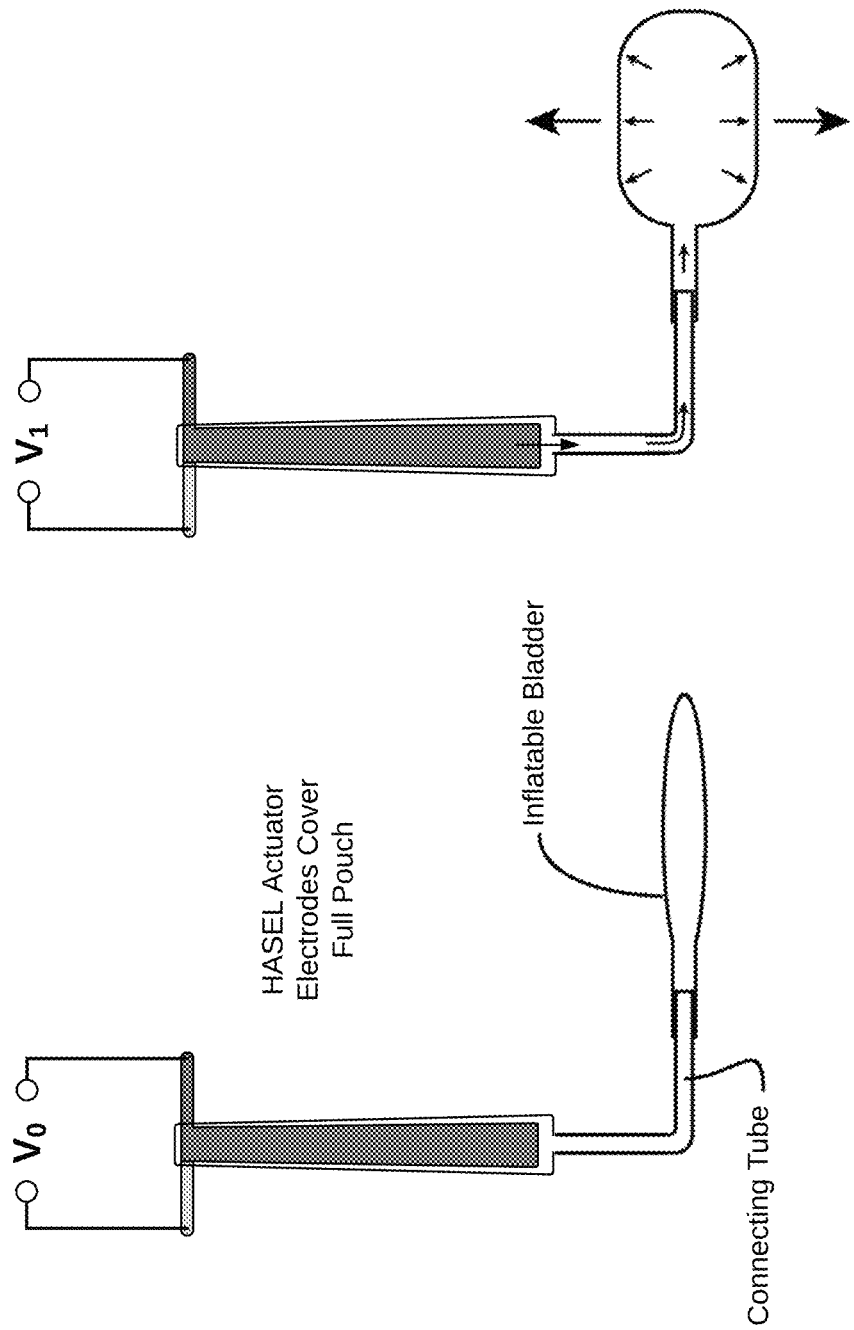
FIG. 20A shows a pump system including a miniature actuator and a remotely located inflatable bladder, in accordance with an embodiment.
FIG. 20B shows the pump system of FIG. 20A, shown here with the actuator in an activated state such that the remotely located bladder is inflated.

Instead of pumping fluid within a closed pouch, the dielectric fluid can be pumped to an external reservoir or bladder. An exemplary embodiment is illustrated in FIGS. 20A and 20B. This approach separates the high voltage electrodes from the load, such as an inflatable bladder in the illustrated example. As shown in FIG. 20A, a miniature HASEL actuator is connected with the inflatable bladder by a connecting tube. When the miniature HASEL actuator is activated, as shown in FIG. 20B, the actuator activation causes the inflatable bladder to expand.

Figure 21A:
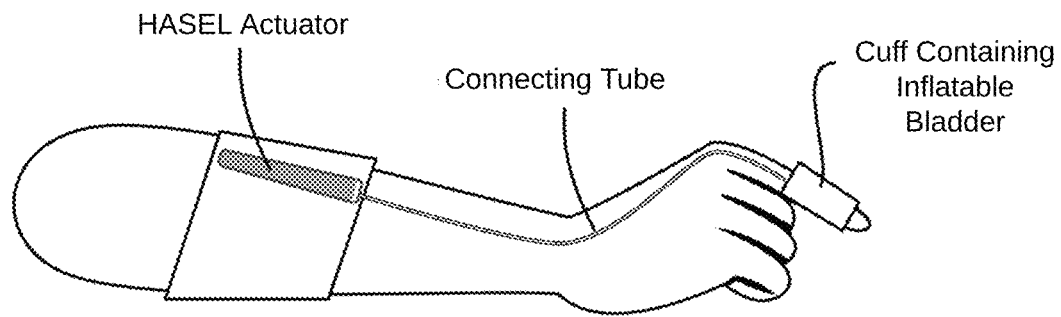
FIG. 21A shows an application of the pump system concept of FIGS. 20A and 20B, in accordance with an embodiment.
Figure 21B:
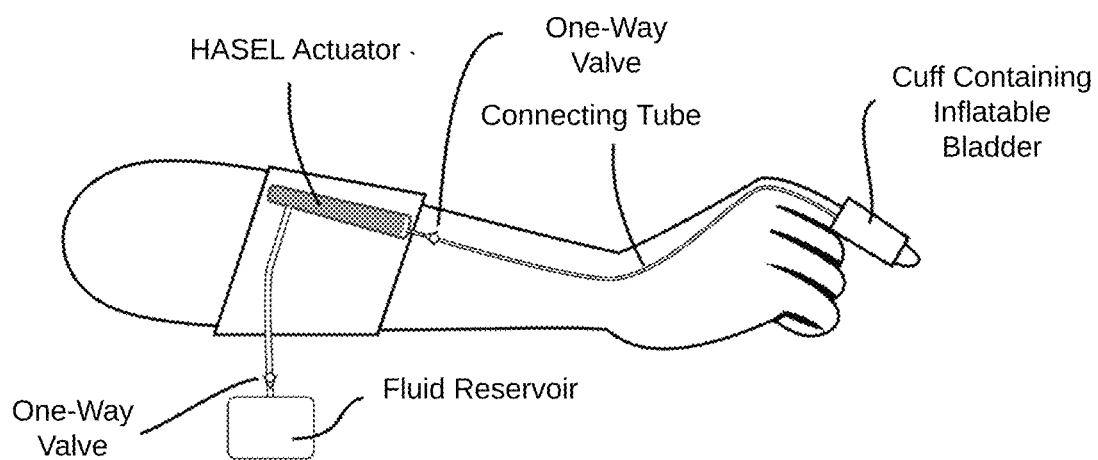
FIG. 21B shows the pump system of FIG. 21A, further including an additional fluid reservoir, in accordance with an embodiment.

An advantage if this approach is that the size of the actuator may be separated from the space requirements at the location of applied force/displacement. For example, the size for an actuator in a blood pressure cuff or tactile actuator may be approximately the size of a fingertip, in accordance with an embodiment shown in FIGS. 21A and 21B. Locating the active part of the actuator, such as the electrodes and dielectric layers, away from the applied cuff would provide room for larger electrodes and more liquid volume. In this way, a higher capacity actuator may be used to perform a function at a remotely located, space restricted. For example, while the fixed volume of the actuator at the fingertip as shown in FIGS. 21A and 21B may limit the amount of fluid that can be displaced at the application site, the use of an external reservoir of fluid along with a pair of one-way valves may enable the pumping of fluid over multiple actuation cycles. With these external, remotely-located components, it is possible to increase both volume displaced and output force, as well as to enable isolation of the high voltage components from the user/wearer, thus enhancing safety. The use of remotely-located components enable safe operation of the overall system associated with the actuator even in a wearable device such as a finger-worn cuff shown in FIGS. 21A and 21B. It is also noted that, in wearable embodiments such as the glove shown in FIG. 14, the power supply for providing the voltage signals to the actuators may be located remotely from the actuators such that the wearer of the wearable device is protected from exposure to high voltage components. In certain embodiments, further protective mechanisms, such as encapsulation layers (discussed below), automatic disconnects, and other electrical safety mechanisms may be integrated into the wearable device. Additional components (not shown) may be used to relieve volume and pressure from the inflatable bladder, if necessary.

Rigid Electrodes

Figure 22A:
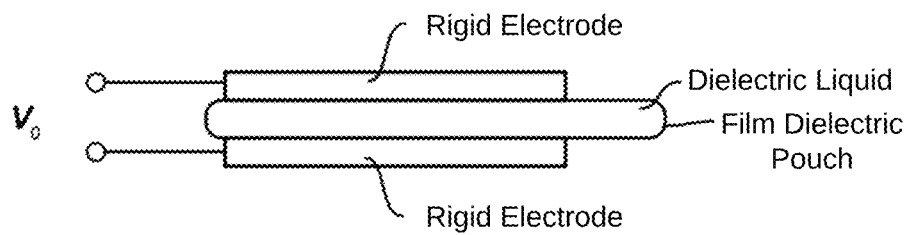
FIG. 22A shows an actuator system with rigid electrodes, in accordance with an embodiment, shown here in a rest state with no applied voltage.
Figure 22B:
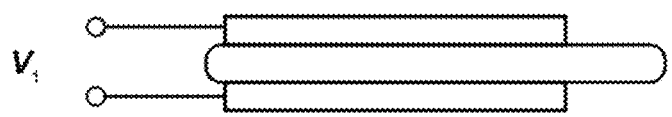
FIG. 22B shows the actuator system of FIG. 22A with a non-zero voltage applied thereto, shown here to illustrate the operations of the actuator system when the non-zero voltage is not sufficient to induce the pulling together of the rigid electrodes.
Figure 22C:
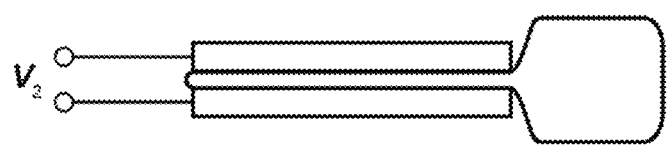
FIG. 22C shows the actuator system of FIGS. 22A and 22B, shown here to illustrate the pulling together of the rigid electrodes in an activated state when a higher voltage $V_2$ is applied thereto.

FIGS. 22A-22C illustrate the operation of an actuator with rigid electrodes, in accordance with an embodiment. As shown in FIG. 22A, an actuator is integrated with rigid electrodes that do not zip together like flexible electrodes. FIG. 22A shows the actuator in a rest state, without a voltage applied thereto.

FIG. 22B shows the actuator with a non-zero voltage V1 applied thereto. With the application of V1, the electrostatic force produced between the electrodes is not yet large enough to pull the electrodes together.

Figure 22D:
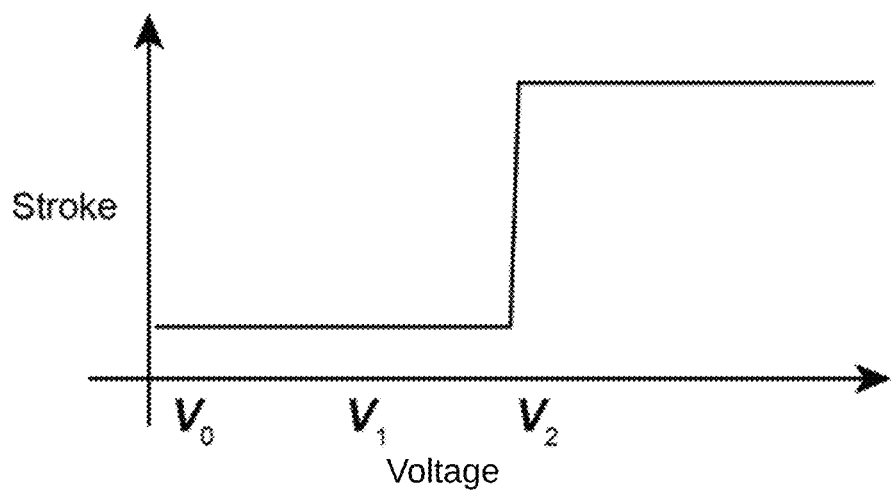
FIG. 22D shows a graphical representation of the relationship between the voltage and stroke, shown here to illustrate the sudden rise in stroke upon application of a voltage value above a threshold value for the system.

FIG. 22C shows the actuator when a higher voltage V2 is applied thereto. In this case, V2 is larger than a critical voltage, at which the electrostatic forces produced by the applied voltage are large enough such that the electrodes "snap" together, thus causing a sudden and large change in displacement. A graphical representation of the stroke as a function of voltage is shown in FIG. 22D. That is, the actuator illustrated in FIGS. 22A-22D essentially operates as a binary actuator that transitions from an "ON" state to an "OFF" state. With the application of a voltage $V_2$ or higher, the rigid electrodes do not separate and are able to maintain their state with a high holding force. Such effects may be enhanced, for example, by the use of magnets as discussed above.

Alternative Pouch and Electrode Shapes

FIGS. 23-27C illustrate alternative configurations of pouch and electrode shapes that are particularly suited for the compact geometries of miniature HASEL actuators. For example, the miniature actuator configurations shown in FIG. 23 include a C-shaped electrode (for actuator 2300), an oval-shaped electrode (for actuator 2320), and a half moon-shaped electrode (for actuator 2340). These electrode shapes preferentially direct the dielectric liquid within the pouches toward a particular location, such as toward one end of the pouch for the C-shaped and half moon-shaped electrodes, and toward the middle oval of the electrode for the oval-shaped electrode. Also, each of the actuator configurations shown in FIG. 23 includes integrated circular connectors connected with and encapsulated in an encapsulation film integrally formed with the dielectric liquid-filled pouch.

Figure 23:
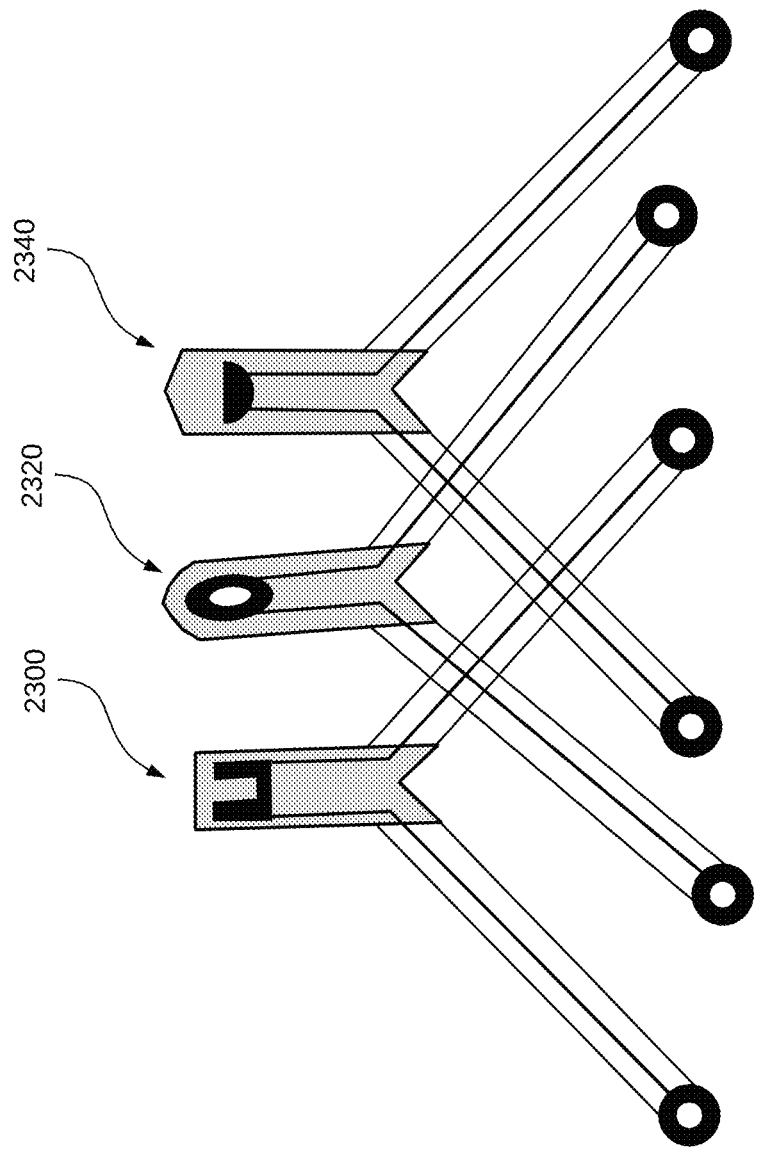
FIG. 23 illustrates front views of alternative configurations of pouch and electrode shapes configured to overcome some known deficiencies of miniature actuators, in accordance with certain embodiments.

Further details of each one of the pouch and electrode configurations of FIG. 23 are shown in FIGS. 24A-24C, in accordance with embodiments. As shown in FIG. 24A, an actuator 2300' includes a dielectric liquid-filled pouch 2410 sandwiched between a first electrode 2412 and a second electrode 2414. Actuator 2300' also includes a skirt 2416, optionally including eyelets 2418. Pouch 2410 may be integrally formed from skirt 2416 by, for example, heat or laser seal. When actuator 2300' is activated, the fluid contained within pouch 2410 is pushed toward the middle portion of the pouch not covered by the electrode.

FIG. 24B shows details of an actuator 2320' including an oval-shaped electrode pair. As shown in FIG. 24B, actuator 2320' includes a dielectric liquid-filled pouch 2430 sandwiched between a first electrode 2432 and a second electrode 2434, where first and second electrodes 2432 and 2434 each includes a void to define an opening 2435. In this configuration, when actuator 2320' is activated, the fluid contained within pouch 2430 is pushed toward opening 2435, thus forming a convex form at opening 2435. Such a configuration may be useful, for example, for providing tactile sensations at a fingertip, among other applications. Actuator 2320' further includes a skirt 2436 with optional eyelets 2438.

FIG. 24C shows an actuator 2340' with half moon-shaped electrodes. As shown in FIG. 24C, actuator 2340' includes a dielectric liquid-filled pouch 2450 sandwiched between a first electrode 2452 and a second electrode 2454, where first and second electrodes 2452 and 2454 are shaped as half moons. In this configuration, the actuator pushes the liquid dielectric toward the portion of the pouch not covered by the electrodes. Actuator 2340' may also include a skirt 2456 with optional eyelets 2458.

FIGS. 25A-25C show different pouch configurations that may be suitable for promoting different actuator shapes when activated, in accordance with embodiments. In particular, the pouches illustrated in FIGS. 25A-25C include edge features that promote specific deformation behavior when a voltage is applied across the actuator electrodes. For example, the pouch shape shown in FIG. 25A, which includes wave edges on opposing long edges of the pouch, may be useful for applications requiring flexibility in the deformed portion of the pouch when activated. Similarly, FIG. 25B shows a pouch shape including a pair of symmetric notches and a flare at a short end of the pouch that may be useful for applications in which the actuation location may require bendability. Alternatively, the pouch shape shown in FIG. 25C with an asymmetric side flare may enable actuation in a perpendicular direction from the overall actuator system install direction.

FIGS. 26A and 26B show different configurations of reinforcement of the electrode arms, in accordance with embodiments. As shown in FIG. 26A, essentially the entire pouch and electrode arm portions are reinforced with a reinforcement material, such as Kapton® tape. In FIG. 26B, the deformable portion of the pouch is not covered with a reinforcement material, in order to preserve the flexibility of the material when the actuator is actuated. Similarly to the embodiments discussed above with respect to FIGS. 12A-12C, the reinforcement material may be selected to provide electrical insulation and mechanical robustness of the actuator. It is noted that, when reinforcement material is provided over the deformable portion of the pouch, the stroke/force performance of the actuator may be reduced due to the additional stiffness provided by the reinforcement material. In certain embodiments, the configuration shown in FIG. 26B may be advantageous as the reinforcement material provides electrical insulation without restricting the deformation of the deformable region of the pouch.

Figure 27C:
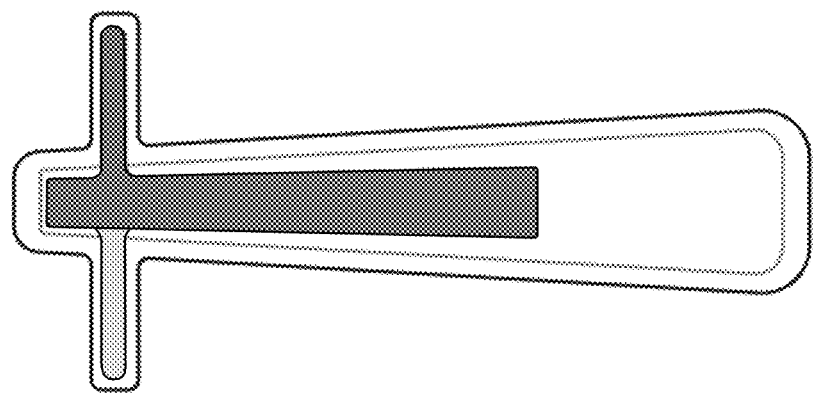
FIG. 27C shows an actuator with squared-off corners, in accordance with an embodiment.
Figure 27B:
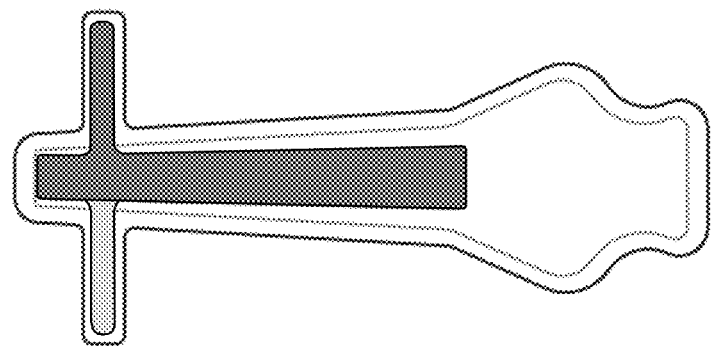
FIG. 27B shows an actuator with notched pouch corners, in accordance with an embodiment.
Figure 27A:
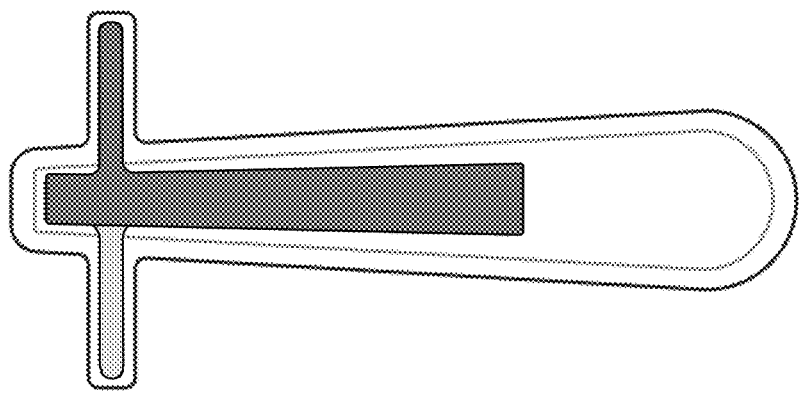
FIG. 27A shows an actuator with rounded pouch ends, in accordance with an embodiment.

FIGS. 27A-27C show further options for the pouch shape, in accordance with certain embodiments. For example, FIG. 27A shows a pouch with a rounded end on the side away from the electrode arms. FIG. 27B shows a version of a pouch with notches on either corners. Further, FIG. 27C shows a pouch with a more squared-off end compared to the rounded version shown in FIG. 27A. The different pouch configurations provide slightly different actuation performance, such as force as a function of stroke and different tactile sensations, and may be tailored according to the intended use and installation location.

It is recognized herein that, as illustrated in the above discussed embodiments, careful selection, combination, and placement of the materials used to form one or more portions of the pouch, electrodes, and reinforcement materials (if used) may be used to tailor the performance of the actuators described herein. Moreover, the size and configuration of miniature actuators make them particularly susceptible to performance changes according to the material selection and placement for each key component in the actuator. Thus, the careful consideration of the various parameters, including characterization of different design combinations such as demonstrated in the stroke/force graphs for example, are necessary in manufacturing a miniature actuator.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

The invention claimed is:

1. An actuator system comprising:
an actuator including
a deformable shell defining a pouch including an enclosed internal cavity,
a fluid dielectric contained within the enclosed internal cavity,
a first electrode disposed over a first side of the pouch and external to the enclosed internal cavity, the first electrode having two long edges and two short edges, and
a second electrode disposed over a second side of the pouch and external to the enclosed internal cavity, the second electrode having two long edges and two short edges; and
a power source for providing a voltage across the enclosed internal cavity between the first electrode and the second electrode,
wherein the pouch has two long edges each with a length of 0.5 mm to 100 mm, two short edges each with a width of 0.1 mm to 20 mm, and an initial thickness of 0.1 mm to 10 mm, wherein the first electrode and the second electrode cover 50% to 90% of the first side and the second side, respectively, of the pouch, and
wherein a first gap is defined between a first one of the two long edges of the pouch and a first one of the two long edges of the first electrode, a second gap is defined between the second one of the two long edges of the pouch and the second one of the two long edges of the first electrode, a third gap is defined between the first one of the two long edges of the pouch and a first one of the two long edges of the second electrode, and a fourth gap is defined between the second one of the two long edges of the pouch and the second one of the two long edges of the second electrode such that, upon application of the voltage, the first electrode and the second electrode selectively zip together along a zipping direction parallel to the two long edges of the first electrode and the second electrode and from one of the two short edges of the first electrode and the second electrode toward an opposing one of the two short edges of the first electrode and the second electrode.

2. The system of claim 1, wherein the gaps are angled from the one of the two short edges of the first electrode and the second electrode toward the opposing one of the two short edges of the first electrode and the second electrode.

3. The system of claim 1, wherein the pouch includes an edge feature configured for increased pouch flexibility.

4. The system of claim 3, wherein the pouch is asymmetric in shape.

5. The system of claim 1, wherein the first electrode and the second electrode are configured for directing the fluid dielectric toward a location within the pouch.

6. The system of claim 5, wherein the first electrode and the second electrode include at least one of a C-shape, an oval-shape, and a half moon shape.

7. The system of claim 1, further comprising:

an inflatable bladder located remotely from the actuator; and a connector for connecting the inflatable bladder with the actuator, wherein activation of the actuator is correlated with activation of the inflatable bladder.

8. The system of claim 7, wherein the power source is also located remotely from the inflatable bladder.

9. The system of claim 8, wherein the actuator is integrated into a wearable device.

10. The system of claim 1, further comprising a reinforcement layer covering at least the first electrode and the second electrode.

11. The system of claim 1, wherein the first and second electrodes are formed of a rigid material.

12. The system of claim 1, wherein the pouch is formed of a first material in portions of the pouch in direct contact with the first and second electrodes, and wherein the pouch is formed of a second material in portions of the pouch not in direct contact with the first and second electrodes.

13. A method for operating an actuator system, the method comprising:

providing an actuator including a deformable shell defining a pouch including an enclosed internal cavity, a fluid dielectric contained within the enclosed internal cavity, a first electrode disposed over a first side of the pouch and external to the enclosed internal cavity, the first electrode having two long edges and two short edges, and a second electrode disposed over a second side of the pouch and external to the enclosed internal cavity, the second electrode having two long edges and two short edges, wherein the pouch has two long edges each with a length of 0.5 mm to 100 mm, two short edges each with a width of 0.1 mm to 20 mm, and an initial thickness of 0.1 mm to 10 mm, wherein the first electrode and the second electrode cover 50% to 90% of the first side and the second side, respectively, of the pouch, and wherein a first gap is defined between a first one of the two long edges of the pouch and a first one of the two long edges of the first electrode, a second gap is defined between the second one of the two long edges of the pouch and the second one of the two long edges of the first electrode, a third gap is defined between the first one of the two long edges of the pouch and a first one of the two long edges of the second electrode, and a fourth gap is defined between the second one of the two long edges of the pouch and the second one of the two long edges of the second electrode, and providing a voltage across the enclosed internal cavity between the first electrode and the second electrode such that the first electrode and the second electrode selectively zip together along a zipping direction parallel to the two long edges of the first electrode and the second electrode and from one of the two short edges of the first electrode and the second electrode toward an opposing one of the two short edges of the first electrode and the second electrode.

* * * * *